(12) United States Patent
Sun et al.

(10) Patent No.: US 10,790,937 B1
(45) Date of Patent: Sep. 29, 2020

(54) HYBRID AUTOMATIC REPEAT REQUEST FOR WIRELESS LOCAL AREA NETWORK

(71) Applicant: NXP USA, Inc., Austin, TX (US)

(72) Inventors: Yakun Sun, San Jose, CA (US); Liwen Chu, San Ramon, CA (US); Hongyuan Zhang, Fremont, CA (US); Sudhir Srinivasa, Campbell, CA (US); Hui-Ling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 108 days.

(21) Appl. No.: 15/876,360

(22) Filed: Jan. 22, 2018

Related U.S. Application Data

(63) Continuation of application No. 14/600,766, filed on Jan. 20, 2015, now Pat. No. 9,876,614.

(Continued)

(51) Int. Cl.
*H04L 1/18* (2006.01)
*H04L 5/00* (2006.01)
(Continued)

(52) U.S. Cl.
CPC .......... *H04L 1/1812* (2013.01); *H04L 1/1664* (2013.01); *H04L 1/1867* (2013.01);
(Continued)

(58) Field of Classification Search
CPC ... H04L 1/1812; H04L 1/1664; H04L 1/1867; H04L 5/0055; H04L 27/2602;
(Continued)

(56) References Cited

U.S. PATENT DOCUMENTS 6,718,497 B1 4/2004 Whitby-Strevens
7,054,296 B1 5/2006 Sorrells et al.
(Continued)

FOREIGN PATENT DOCUMENTS

GB 2510139 A 7/2014

OTHER PUBLICATIONS

IEEE Std 802.11ac/D7.0 "Draft STANDARD for Information Technology-Telecommunications and information exchange between systems-Local and metropolitan area networks-Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

(Continued)

*Primary Examiner* — Un C Cho
*Assistant Examiner* — Shah M Rahman

(57) ABSTRACT

A first communication device generates and transmits a first physical layer (PHY) data unit as part of a hybrid automatic repeat request (HARQ) session, the first PHY data unit having a first plurality of media access control (MAC) protocol data units (MPDUs) including a first MPDU. The first communication device determines that a second communication device did not acknowledge successfully receiving the first MPDU. The first communication device generates and transmits a second PHY data unit as part of the HARQ session, the second PHY data unit having a second plurality of MPDUs, the second plurality of MPDUs including the first MPDU.

22 Claims, 12 Drawing Sheets

Related U.S. Application Data

(60) Provisional application No. 61/935,215, filed on Feb. 3, 2014, provisional application No. 61/929,400, filed on Jan. 20, 2014.

(51) Int. Cl.
    *H04L 27/26*     (2006.01)
    *H04L 1/16*     (2006.01)
    *H04W 84/02*     (2009.01)
    *H04W 84/12*     (2009.01)

(52) U.S. Cl.
CPC ........ *H04L 5/0055* (2013.01); *H04L 27/2602* (2013.01); *H04L 27/2607* (2013.01); *H04L 1/1825* (2013.01); *H04W 84/025* (2013.01); *H04W 84/12* (2013.01)

(58) Field of Classification Search
CPC . H04L 27/2607; H04L 1/1825; H04L 1/1864; H04L 1/1896; H04W 84/025; H04W 84/12
See application file for complete search history.

(56) References Cited

U.S. PATENT DOCUMENTS

| | | | | |
|---|---|---|---|---|
| 8,175,015 | B1* | 5/2012 | Chowdhuri | G06F 9/461 370/300 |
| 8,599,803 | B1* | 12/2013 | Zhang | H04L 1/0643 370/338 |
| 9,319,174 | B2* | 4/2016 | Merlin | H04L 1/0023 |
| 9,351,333 | B1* | 5/2016 | Zhang | H04W 28/065 |
| 9,876,614 | B1 | 1/2018 | Sun et al. | |
| 2005/0180315 | A1* | 8/2005 | Chitrapu | H04B 7/2628 370/208 |
| 2006/0050742 | A1 | 3/2006 | Grandhi et al. | |
| 2007/0186134 | A1 | 8/2007 | Singh et al. | |
| 2007/0245205 | A1 | 10/2007 | Popovski et al. | |
| 2008/0165670 | A1* | 7/2008 | Tao | H04L 5/0053 370/203 |
| 2009/0031185 | A1 | 1/2009 | Xhafa et al. | |
| 2009/0074088 | A1* | 3/2009 | Tao | H04L 1/0007 375/260 |
| 2009/0219851 | A1* | 9/2009 | Abraham | H04L 1/1812 370/315 |
| 2009/0219870 | A1 | 9/2009 | Wengerter et al. | |
| 2009/0259915 | A1* | 10/2009 | Livshitz | H03M 13/1111 714/758 |
| 2010/0054189 | A1* | 3/2010 | Chang | H04L 1/1896 370/328 |
| 2011/0038332 | A1 | 2/2011 | Liu et al. | |
| 2011/0134816 | A1 | 6/2011 | Liu et al. | |
| 2011/0199971 | A1 | 8/2011 | Kim et al. | |
| 2011/0305176 | A1 | 12/2011 | Wentink | |
| 2012/0051342 | A1* | 3/2012 | Liu | H04W 72/10 370/338 |
| 2012/0140753 | A1 | 6/2012 | Lee et al. | |
| 2013/0229996 | A1 | 9/2013 | Wang et al. | |
| 2013/0235860 | A1* | 9/2013 | Vermani | H04W 28/06 370/338 |
| 2013/0315139 | A1 | 11/2013 | Abraham et al. | |
| 2014/0079016 | A1 | 3/2014 | Dai et al. | |
| 2014/0126580 | A1 | 5/2014 | Sampath et al. | |
| 2014/0185695 | A1 | 7/2014 | Kenney et al. | |
| 2014/0192820 | A1* | 7/2014 | Azizi | C12N 15/74 370/445 |
| 2014/0293868 | A1 | 10/2014 | Levanen et al. | |
| 2015/0049677 | A1 | 2/2015 | Lin et al. | |
| 2015/0063233 | A1 | 3/2015 | Choi et al. | |
| 2016/0197705 | A1* | 7/2016 | Ryu | H04L 1/1896 370/242 |
| 2017/0230149 | A1* | 8/2017 | Wang | H04L 1/0057 |

OTHER PUBLICATIONS

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

Chen, "Home Network Basis: Transmission Environments and Wired/Wireless Protocols," Prentice Hall, pp. 1-26 (Jul. 2003).

Hiertz et al., "The IEEE 802.11 Universe," IEEE Communications Magazine, pp. 62-70, (Jan. 2010).

Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).

U.S. Appl. No. 14/582,568, Sun et al., "Systems and Methods for Introducing Time Diversity in WiFi Transmissions," filed Dec. 24, 2014.

\* cited by examiner

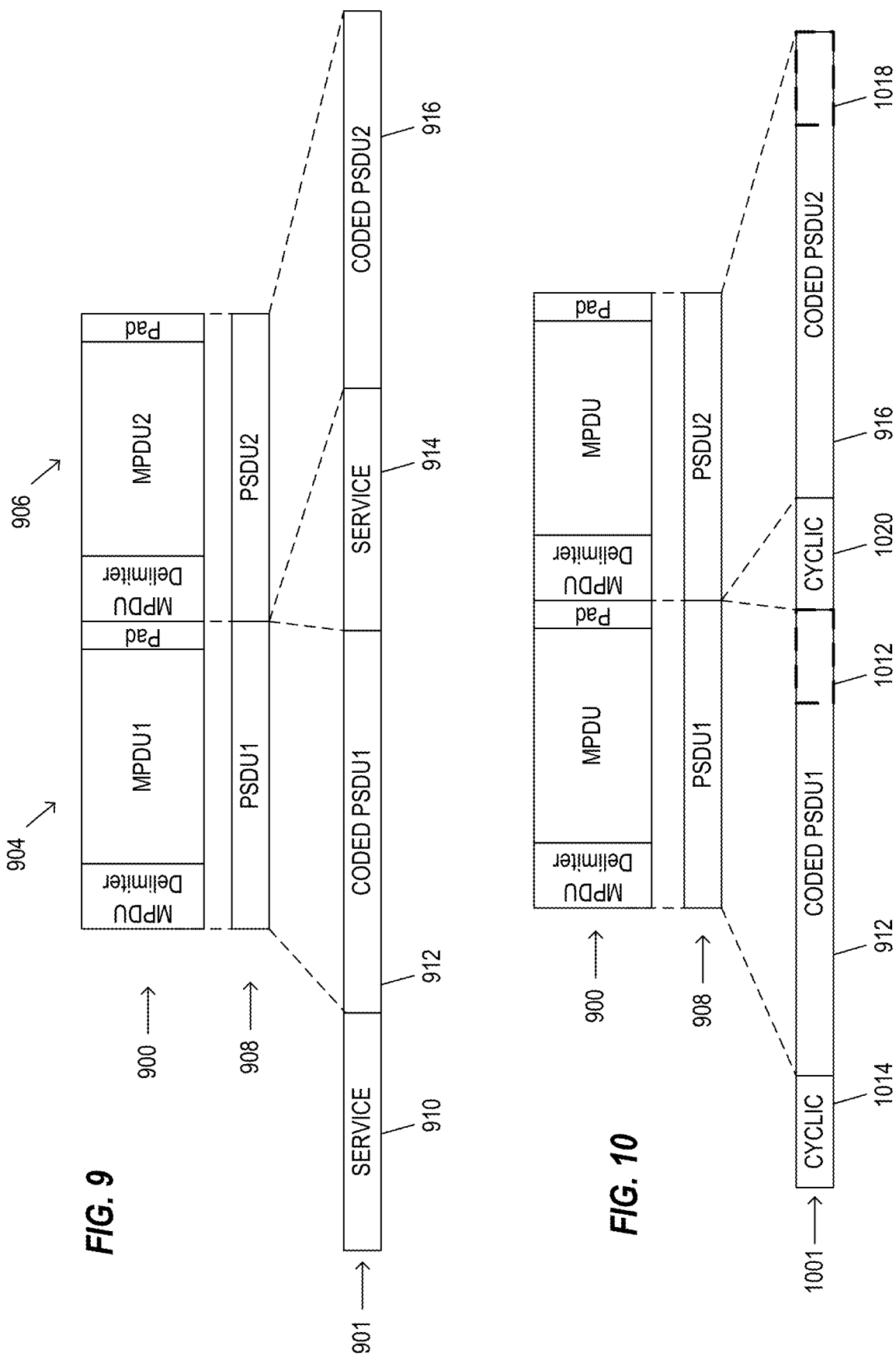

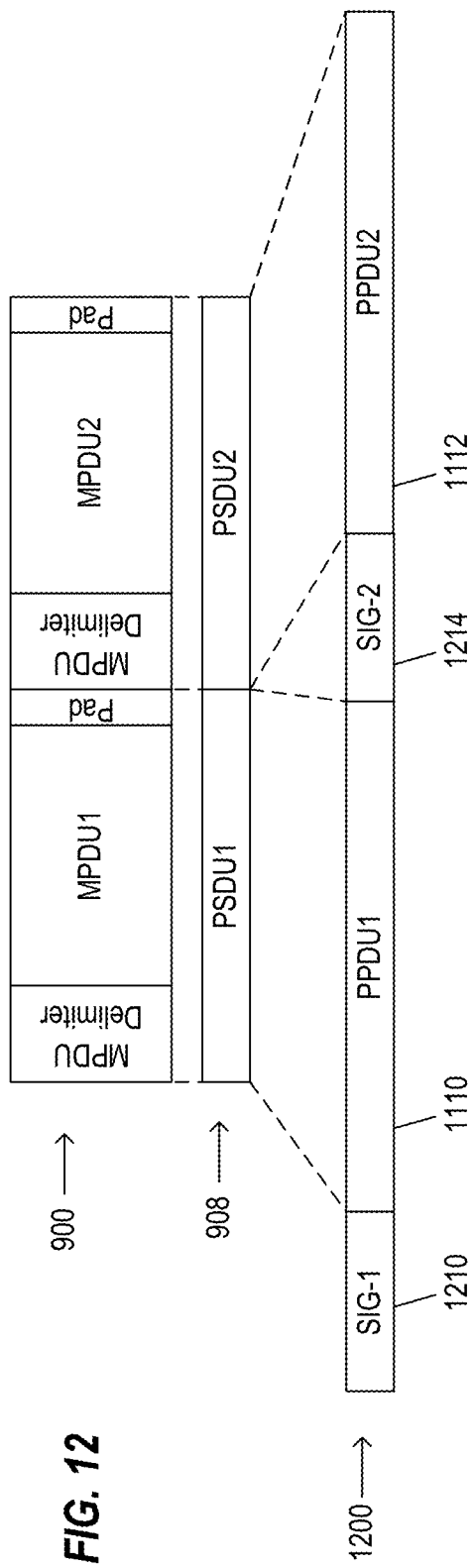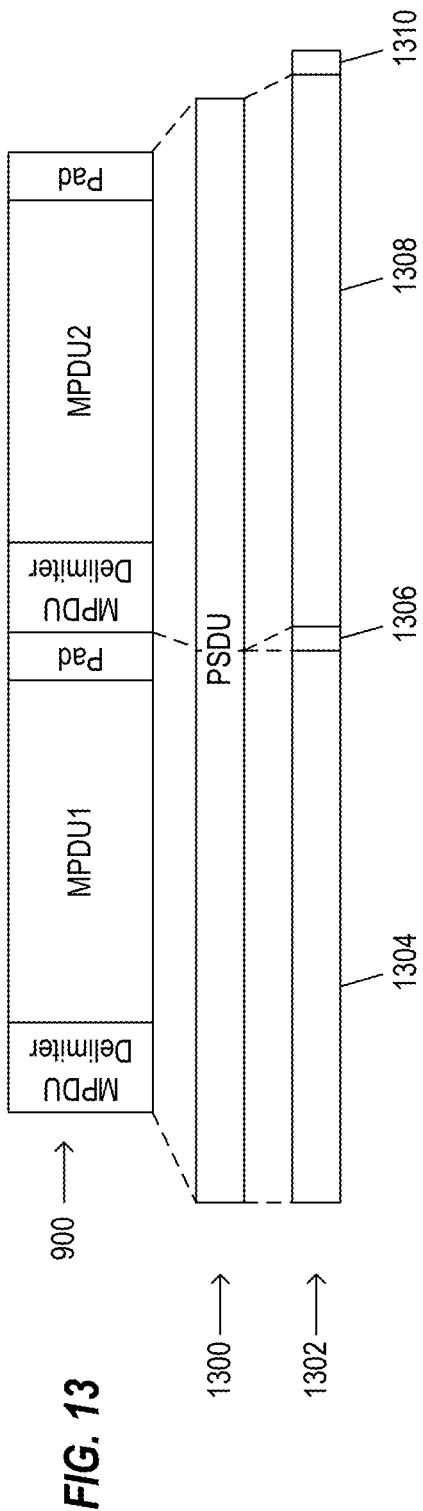

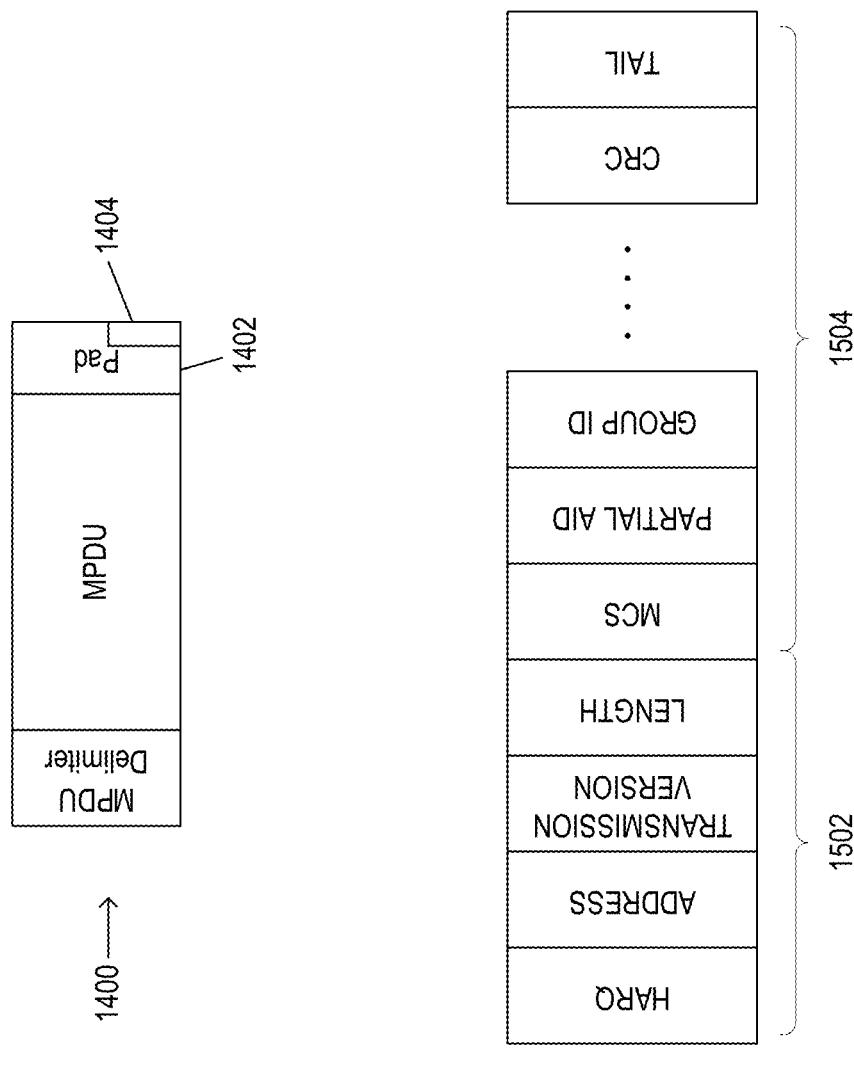

HYBRID AUTOMATIC REPEAT REQUEST FOR WIRELESS LOCAL AREA NETWORK

CROSS-REFERENCES TO RELATED APPLICATIONS

This application is a continuation of U.S. patent application Ser. No. 14/600,766, now U.S. Pat. No. 9,876,614, entitled "Hybrid Automatic Repeat Request for Wireless Local Area Network," filed on Jan. 20, 2015, which claims the benefit of U.S. Provisional Patent Application No. 61/929,400, entitled "HARQ Operation for WiFi," filed on Jan. 20, 2014, and U.S. Provisional Patent Application No. 61/935,215, entitled "HARQ Operation for WiFi," filed on Feb. 3, 2014. The disclosures of all of the applications referenced above are incorporated herein by reference in their entireties.

FIELD OF THE DISCLOSURE

The present disclosure is related generally to communication networks and, more particularly, to wireless local area networks that process packets with automatic error control.

BACKGROUND

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

SUMMARY

In an embodiment, a method is for communicating in a wireless local area network (WLAN) that includes a first communication device and a second communication device. The method includes: generating, at the first communication device, a first physical layer (PHY) data unit as part of a hybrid automatic repeat request (HARQ) session, the first PHY data unit having a first plurality of media access control (MAC) protocol data units (MPDUs) including a first MPDU. Generating the first PHY data unit includes: for each MPDU in the first plurality of MPDU, modulating and packing data of the MPDU into orthogonal frequency division multiplexing (OFDM) symbols such that each MPDU of the first plurality of MPDUs corresponds to a separate group of OFDM symbols in the first PHY data unit. The method also includes: transmitting, by the first communication device, the first PHY data unit; determining, at the first communication device, that the second communication device did not acknowledge successfully receiving a set of one or more MPDUs among the first plurality of MPDUs, the set of one or more MPDUs including the first MPDU; and generating, at the first communication device, a second PHY data unit as part of the HARQ session, the second PHY data unit having a second plurality of MPDUs. Generating the second PHY data unit includes: including at least the first MPDU in the second plurality of MPDUs in response to determining that the second communication device did not acknowledge successfully receiving the set of one or more MPDUs, and for each MPDU in the second plurality of MPDUs, modulating and packing data of the MPDU into OFDM symbols such that each MPDU of the second plurality of MPDUs corresponds to a separate group of OFDM symbols in the second PHY data unit. The method further includes transmitting, by the first communication device, the second PHY data unit.

In another embodiment, an apparatus comprises: a wireless local area network (WLAN) interface device associated with a first communication device, the network interface device having one or more integrated circuits (ICs) configured to: generate a first physical layer (PHY) data unit as part of a hybrid automatic repeat request (HARQ) session, the first PHY data unit having a first plurality of media access control (MAC) protocol data units (MPDUs) including a first MPDU. Generating the first PHY data unit includes: for each MPDU in the first plurality of MPDU, modulating and packing data of the MPDU into orthogonal frequency division multiplexing (OFDM) symbols such that each MPDU of the first plurality of MPDUs corresponds to a separate group of OFDM symbols in the first PHY data unit. The one or more ICs are further configured to: control the WLAN interface device to transmit the first PHY data unit, determine that a second communication device did not acknowledge successfully receiving a set of one or more MPDUs among the first plurality of MPDUs, the set of one or more MPDUs including the first MPDU, and generate a second PHY data unit as part of the HARQ session, the second PHY data unit having a second plurality of MPDUs. Generating the second PHY data unit includes: including at least the first MPDU in the second plurality of MPDUs in response to determining that the second communication device did not acknowledge successfully receiving the set of one or more MPDUs, and for each MPDU in the second plurality of MPDUs, modulating and packing data of the MPDU into OFDM symbols such that each MPDU of the second plurality of MPDUs corresponds to a separate group of OFDM symbols in the second PHY data unit. The one or more ICs are further configured to control the WLAN interface device to transmit the second PHY data unit.

BRIEF DESCRIPTION OF THE DRAWINGS

FIG. 9 is a diagram illustrating an example coded bit stream that includes one or more PHY service fields to indicate MPDU boundaries, in an embodiment.

FIG. 10 is a diagram illustrating an example coded bit stream that includes cyclic sequences to indicate MPDU boundaries, in an embodiment.

FIG. 12 is a diagram illustrating an example PPDU that includes one or more signal fields to indicate MPDU boundaries, in an embodiment.

FIG. 13 is a diagram illustrating an example PHY service data unit (PSDU) that includes tail bits to indicate MPDU boundaries, in an embodiment.

FIG. 14 is a diagram illustrating an example MPDU of an A-MPDU that includes tail bits within MPDU padding to indicate an MPDU boundary, in an embodiment.

FIG. 15 is a diagram illustrating example signal fields for PPDUs of a HARQ session, in an embodiment.

DETAILED DESCRIPTION

Figure 1:
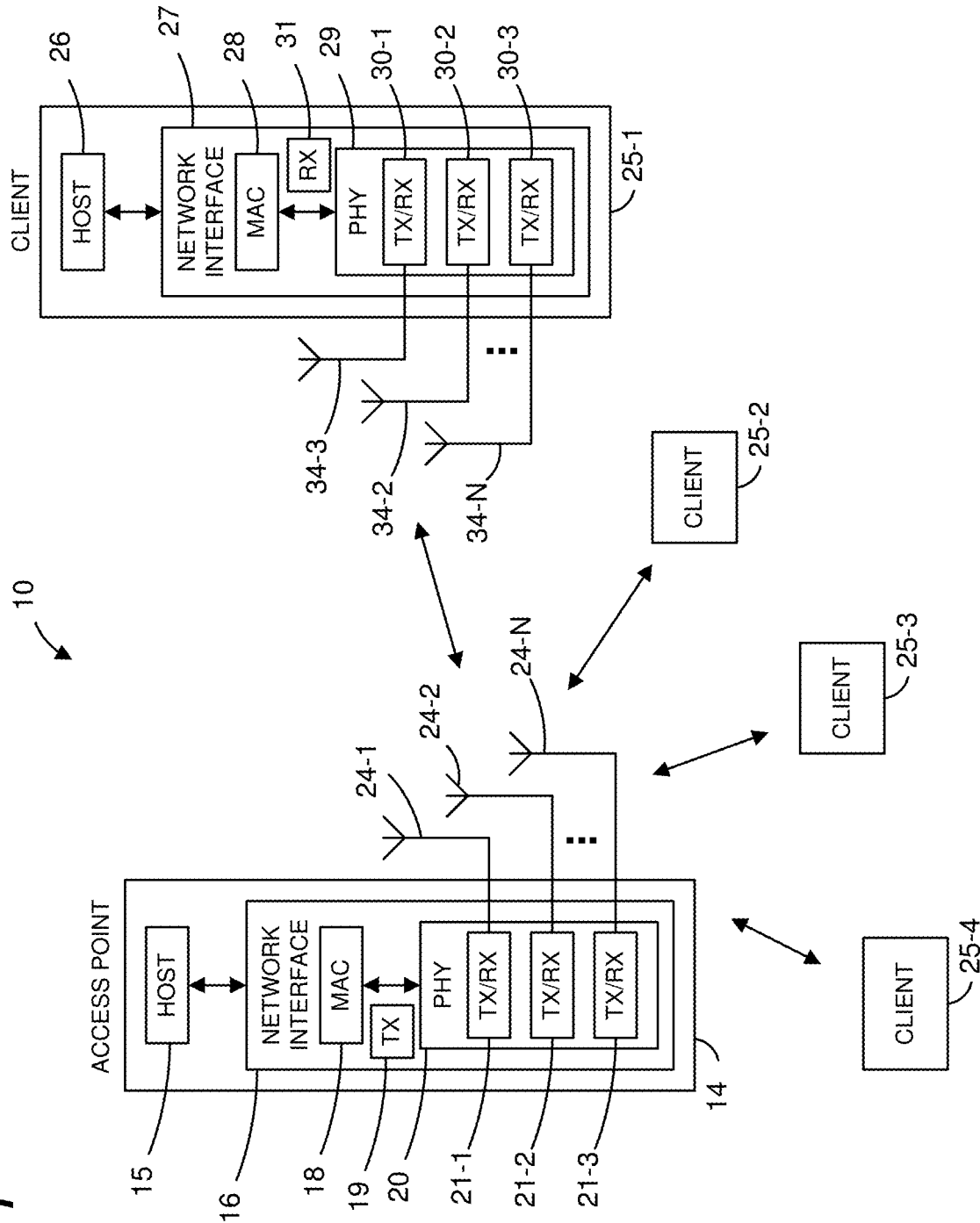
FIG. 1 is a block diagram of an example wireless local area network (WLAN), according to an embodiment.

Packets transferred over a wireless local area network (WLAN) communication channel are often prone to transmission errors due to destructive interference caused by multipath propagation, for example. In some scenarios, a retransmission is performed by a transmitter when a receiver fails in decoding a packet. For a transmitter and receiver using an automatic repeat request (ARQ) procedure, the receiver attempts to decode the retransmitted packet, relying on a diminishing probability of error over multiple transmissions. In some scenarios, a retransmission of a packet at a later time allows for improved channel conditions and thus a higher likelihood of successfully decoding the retransmitted packet. However, the probability of error may decay at a very slow rate for frequency selective and slow fading channels which are often present in WLANs.

For a transmitter and receiver using a hybrid automatic repeat request (HARQ) procedure, the receiver combines received signals associated with an initial transmission of a packet with one or more retransmissions of the packet to improve the probability of successfully decoding the packet. However, this procedure requires the transmitter to buffer the packet for retransmission and the receiver to buffer the received signals for combination. Additionally, the respective codewords of the portions of the packet to be combined must be the same between the initial transmission and retransmissions.

In the embodiments described below, a transmitter such as an access point or client station in a WLAN transmits packets that support a HARQ procedure for reception by a receiver (e.g., the client station, the access point, another client station, another access point, etc.). Packets are transmitted as media access control layer protocol data units (MPDUs) which are encapsulated within physical layer protocol data units (PHY data unit or PPDU). In various embodiments, the transmitter is configured to buffer (MPDUs) for retransmission to the receiver. In an embodiment, the transmitter generates the PHY data unit to include a PHY signal field that indicates whether the MPDUs are an initial transmission or a retransmission. The transmitter generates the PHY signal field to indicate an address of the receiver, in at least some embodiments. In some scenarios, the receiver is configured to determine whether a received PHY data unit is intended for that receiver and also whether the MPDUs within the received PHY data unit are retransmissions of previously received MPDUs. In some embodiments, the transmitter uses a time-dependent transmission scheme to introduce artificial time diversity for retransmitted MPDUs. In some scenarios, artificial time diversity improves HARQ performance even without significant changes in the channel conditions between the initial transmission and retransmission. Examples of introducing time diversity are described in U.S. patent application Ser. No. 14/582,568, entitled "Systems and Methods for Introducing Time Diversity in WiFi Transmissions," filed on Dec. 24, 2014, which is incorporated herein by reference in its entirety.

FIG. 1 is a block diagram of an example wireless local area network (WLAN) 10, according to an embodiment. An AP 14 includes a host processor 15 coupled to a network interface 16. The network interface 16 includes a medium access control (MAC) processing unit 18, a buffer 19 (e.g., a transmit (TX) buffer and/or receive (RX) buffer), and a physical layer (PHY) processing unit 20. The PHY processing unit 20 includes a plurality of transceivers 21, and the transceivers are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments.

The WLAN 10 includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. In some embodiments, the AP 14, a client station 25, or another suitable network device is configured to transmit packets that support a HARQ procedure for reception by a receiver (e.g., another AP 14, client station 25, or suitable network device).

A client station 25-1 includes a host processor 26 coupled to a network interface 27. The network interface 27 includes a MAC processing unit 28, a PHY processing unit 29, and a buffer 31 (e.g., a transmit (TX) buffer and/or receive (RX) buffer). The PHY processing unit 29 includes a plurality of transceivers 30, and the transceivers are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In an embodiment, one or more of the client stations 25-2, 25-3, and 25-4 has a structure the same as or similar to the client station 25-1. In these embodiments, the client stations 25 structured like the client station 25-1 have the same or a different number of transceivers and antennas. For example, the client station 25-2 has only two transceivers and two antennas (not shown), according to an embodiment.

Figure 2:
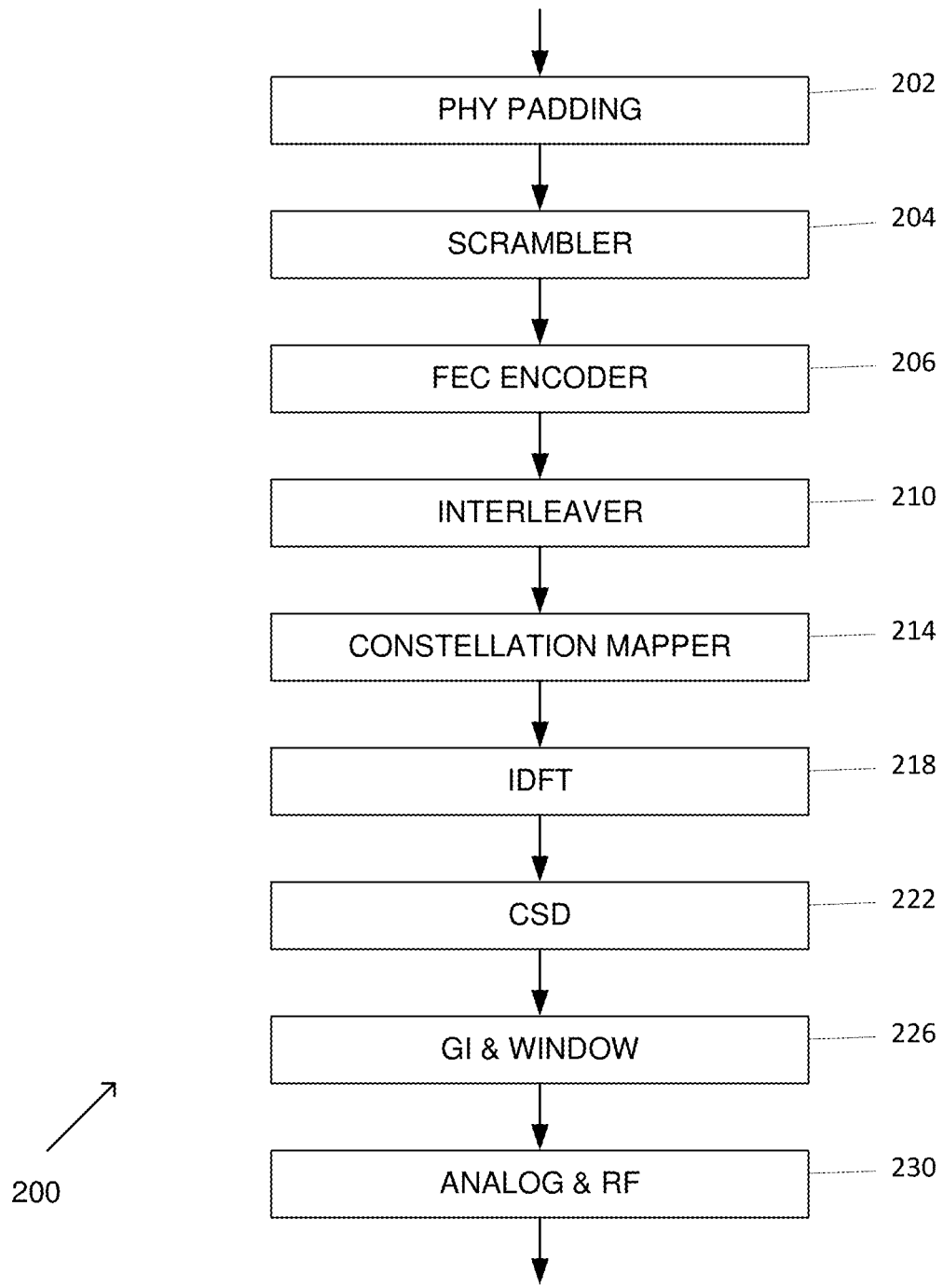
FIG. 2 is a block diagram illustrating an example PHY processing unit for generating physical layer (PHY) data units, according to an embodiment.

FIG. 2 is a block diagram of an example transmit portion of a PHY processing unit 200 for generating and transmitting PHY data units, according to an embodiment. Referring to FIG. 1, the AP 14 and the client station 25-1, in one embodiment, each include a PHY processing unit such as the PHY processing unit 200. In various embodiments and/or scenarios, the PHY processing unit 200 generates a coded bit stream 901 (FIG. 9), a coded bit stream 1001 (FIG. 10), a data field 1101 (FIG. 11), a PPDU 1200 (FIG. 12), a PSDU 1302 (FIG. 13), a MPDU 1400 (FIG. 14), and/or a PHY signal field 1500 (FIG. 15). The PHY processing unit 200 includes a PHY padder 202 that appends PHY padding bits to a PHY service data unit (PSDU), for example, an MPDU received from the MAC processing unit 18. In some embodiments, the PHY padder 202 also appends a suitable number of tail bits to the received MPDU based on a forward error correction (FEC) encoding to be used.

The PHY processing unit 200 includes a PHY scrambler 204 that generally scrambles an information bit stream to reduce the occurrence of long sequences of ones or zeros, for example, in an embodiment. An FEC encoder 206 encodes scrambled information bits to generate encoded data bits. In one embodiment, the FEC encoder 206 includes a binary convolutional code (BCC) encoder. In another embodiment, the FEC encoder 206 includes a binary convolutional encoder followed by a puncturing block. In yet another embodiment, the FEC encoder 206 includes a low density parity check (LDPC) encoder. An interleaver 210 receives the encoded data bits and interleaves the bits (i.e., changes the order of the bits) to prevent long sequences of adjacent noisy bits from entering a decoder at the receiver. A constellation mapper 214 maps the interleaved sequence of bits to constellation points corresponding to different subcarriers of an OFDM symbol. More specifically, for each spatial stream, the constellation mapper 214 translates every bit sequence of length $\log_2(M)$ into one of M constellation points.

The output of the constellation mapper 214 is operated on by an inverse discrete Fourier transform (IDFT) unit 218 that converts a block of constellation points to a time-domain signal. In embodiments or situations in which the PHY processing unit 200 operates to generate data units for transmission via multiple spatial streams, the cyclic shift diversity (CSD) unit 222 inserts a cyclic shift into all but one of the spatial streams to prevent unintentional beamforming. The output of the CSD unit 222 is provided to the guard interval (GI) insertion and windowing unit 226 that prepends, to an OFDM symbol, a circular extension of the OFDM symbol and smooths the edges of each symbol to increase spectral decay. The output of the GI insertion and windowing unit 226 is provided to an analog and radio frequency (RF) unit 230 that converts the signal to analog signal and upconverts the signal to an RF frequency for transmission. In an embodiment, the PHY processing unit 200 includes similar receive elements (not shown) to perform a reverse process of the steps described above for receiving and decoding a PHY data unit.

Figure 3:
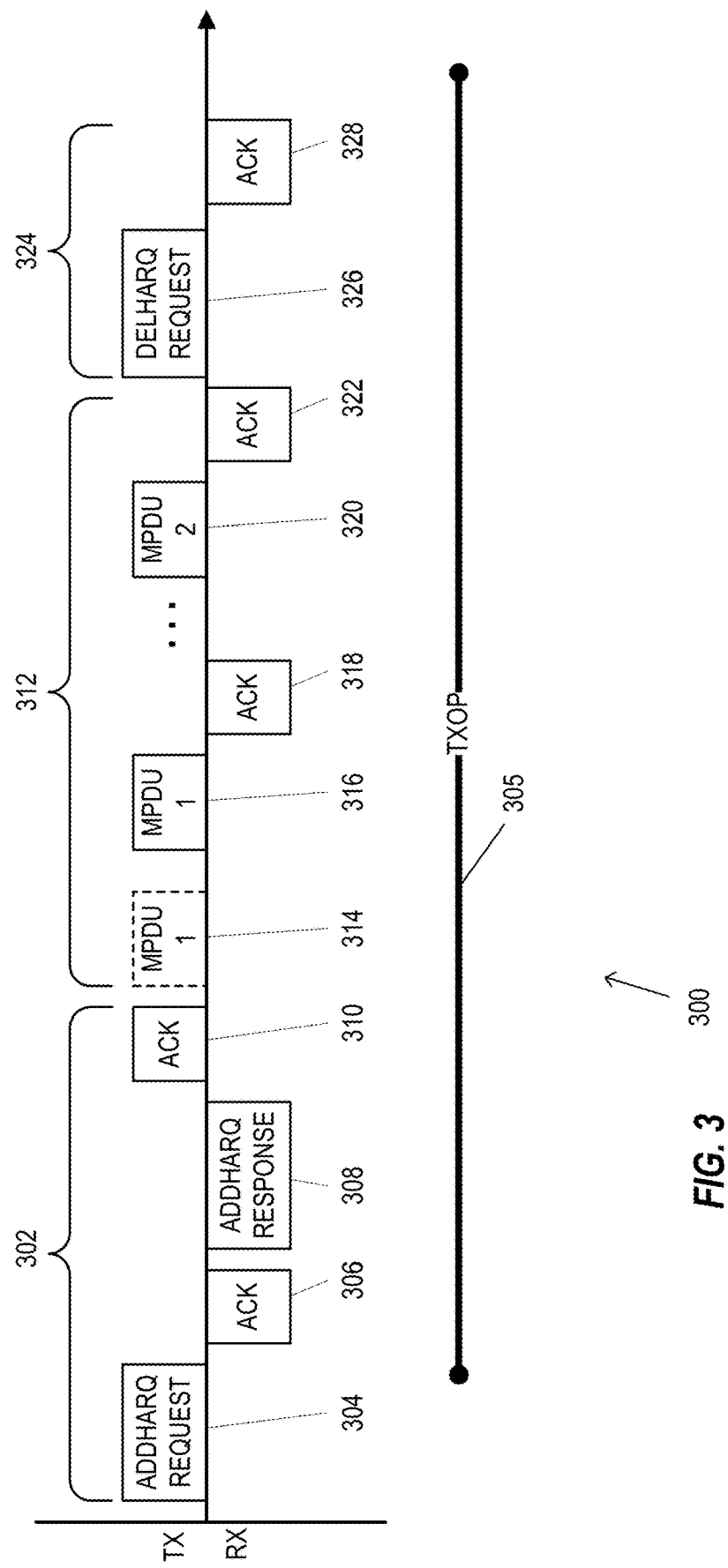
FIG. 3 is a message sequence diagram illustrating example messages for a first communication device that transmits media access control layer protocol data units (MPDUs) to a second communication device during a hybrid automatic repeat request (HARQ) session, according to an embodiment.

FIG. 3 is a message sequence diagram illustrating example messages for a first communication device that sends MPDUs to a second communication device during a HARQ session 300, according to an embodiment. As described herein, the first communication device is a transmitter, such as the AP 14, while the second communication device is a receiver, such as the client station 25-1. In other embodiments, the first communication device is the client station 25-1 or other suitable communication device and the second communication device is the AP 14 or other suitable communication device.

The AP 14 and client station 25-1 cooperate to perform a setup 302 of the HARQ session 300, in an embodiment. During the setup 302, the AP 14 transmits a HARQ control frame 304 (ADDHARQ REQUEST) to initiate the HARQ session 300, in an embodiment. In some embodiments, the AP 14 is configured to include one or more HARQ parameters for the HARQ session 300 within the HARQ control frame 304. Examples of HARQ parameters include, for example, a transmit buffer size, a number of packets to be sent, an expiration indication, an indication of whether the AP 14 supports aggregate MPDUs (A-MPDUs) for HARQ transmissions, an indication of whether the AP 14 supports partial A-MPDUs for HARQ transmissions, or other suitable parameters.

In some embodiments, the HARQ session 300 is established during a transmission opportunity (TXOP) 305 of the AP 14. In an embodiment, a TXOP is a bounded time interval reserved for a communication device in a network during which the communication device can send as many frames as possible (as long as the duration of the transmissions does not extend beyond the PPDU length defined by the first communication device and beyond the TXOP). In an embodiment, other communication devices are generally not permitted to transmit in the TXOP unless the communication device to which the TXOP is assigned specifically permits the other communication device to transmit or unless the other communication device is acknowledging a transmission of the communication device to which the TXOP is assigned. For example, in an embodiment, the HARQ control frame 304 indicates a length of the TXOP 305 such that packets transmitted during the HARQ session 300 are suitably "protected" from interference from other communication devices (e.g., by setting a network allocation vector). In another embodiment, the AP 14 transmits a request-to-send frame to the client station 25-1 to initiate the TXOP 305. In one such embodiment, the client station 25-1 sends a clear-to-send frame to the AP 14 to confirm the TXOP 305. In other embodiments, the AP 14 and client station 25-1 perform the HARQ session 300 without establishing the TXOP 305 (e.g., "unprotected"). In such embodiments, the AP 14 is configured to indicate HARQ transmissions using a PHY signal field of the PHY data units.

The client station 25-1 confirms receipt of the HARQ control frame 304 by transmitting an acknowledgment 306 after a short interframe space (SIFS) time period or other suitable first time period and within a suitable second time period, in an embodiment. The client station 25-1 accepts the request for the HARQ session 300 by transmitting a HARQ control frame 308 (ADDHARQ RESPONSE) in response to the HARQ control frame 304, in an embodiment. In some embodiments, the client station 25-1 is configured to include one or more HARQ parameters for the HARQ session 300 within the HARQ control frame 308. Examples of HARQ parameters include, for example, a receive buffer size, a receive buffer status, a number of packets to be received, an expiration indication, an indication of whether the client station 25-1 supports aggregate MPDUs (A-MPDUs) for HARQ transmissions, an indication of whether the client station 25-1 supports partial A-MPDUs for HARQ transmissions, or other suitable parameters. In an embodiment, the AP 14 and the client station 25-1 negotiate one or more HARQ parameters for the HARQ session 300 using the HARQ control frame 304, the HARQ control frame 308, and/or other suitable frames. In an embodiment, the client station 25-1 transmits the HARQ control frame 308 to resolve hidden node issues. For example, in an embodiment, the HARQ control frame 308 indicates a remaining duration of the TXOP 305.

In an embodiment, the client station 25-1 omits the acknowledgment 306 and only transmits the HARQ control frame 308. In another embodiment, the client station 25-1 omits the HARQ control frame 308 and only transmits the acknowledgment 306 in response to the HARQ control frame 304. In yet another embodiment, the client station 25-1 combines the acknowledgment 306 and the HARQ control frame 308 into a single response frame. The AP 14 transmits an acknowledgment 310 to the HARQ control frame 308 to establish the HARQ session 300, in an embodiment.

In the embodiment illustrated in FIG. 3, after the HARQ session 300 has been established, the AP 14 and client station 25-1 perform one or more HARQ transmissions 312 during the transmission opportunity 305. During the HARQ session 300, the AP 14 is configured to generate and transmit a first PHY data unit 314 to the client station 25-1, in an embodiment. The first PHY data unit 314 has i) a data field that includes a first MPDU (MPDU 1) to be transmitted to the client station 25-1, and ii) a PHY signal field that includes a transmission version field set to indicate an initial transmission of the first MPDU, in an embodiment. In an embodiment, the AP 14 is configured to disable the PHY scrambler 204 for transmission of the first PHY data unit 314. The AP 14 stores the first MPDU in a transmit buffer (e.g., TX buffer 19 shown in FIG. 1), in an embodiment. In the scenario of FIG. 3, signals corresponding to the first PHY data unit 314 (shown in dashed lines) are at least partially received, but not successfully decoded, by the client station 25-1. For example, in an embodiment, a MAC service data unit (MSDU) within the first MPDU does not match a frame correction sequence within the first MPDU. In this scenario, the client station 25-1 omits transmission of an acknowledgment in response to the first PHY data unit 314 and stores the received signals in a receive buffer (e.g., RX buffer 31 shown in FIG. 1).

After transmitting the first PHY data unit 314, the AP 14 is configured to determine whether a first acknowledgment to the first MPDU has been received from the client station 25-1, in various embodiments. In an embodiment, the AP 14 determines whether an acknowledgment has been received after a time period corresponding to a point coordination function (PCF) interframe space (PIFS), or another suitable first time period, and within a suitable second time period. In response to determining that the first acknowledgment has not been received within the second time period (e.g., an acknowledgment timeout period), the AP 14 performs a retransmission of the first MPDU from the TX buffer, in an embodiment. In an embodiment, for example, the AP 14 generates and transmits a second PHY data unit 316 to the client station 25-1. The second PHY data unit 316 has i) a data field that includes the first MPDU, and ii) a PHY signal field that includes a transmission version field set to indicate a retransmission of the first MPDU, in an embodiment. The transmission version field provides an indication to the client station 25-1 that the second PHY data unit 316 includes the retransmission of the first MPDU, thus the client station 25-1 can more readily combine signals for the retransmission of the first MPDU with signals associated with the initial transmission of the first MPDU. For example, in an embodiment, the client station 25-1 determines that the first MPDU of the second PHY data unit should be combined with the first MPDU of the first PHY data unit upon decoding of the PHY signal field.

In an embodiment, the AP 14 is configured to disable the PHY scrambler 204 for transmission of the first PHY data unit 314 and the second PHY data unit 316. In an embodiment, the AP 14 is configured to generate each of the first MPDU of the first PHY data unit 314 and the first MPDU of the second PHY data unit 316 to include a retry sub-field of a frame control field of a MAC header to have a same value (i.e., either "0" or "1"). In an embodiment, other suitable fields in the MAC header are inserted, such as suitable fields defined in IEEE 802.11ac or another suitable standard. In some embodiments, the AP 14 generates the data fields of the first PHY data unit 314 and the second PHY data unit to include the first MPDU with a transmission scheme based on a time-dependent function for artificial time diversity. In an embodiment, the AP 14 generates the PHY signal field of the PHY data unit to include an indication of the transmission scheme for use by the client station 25-1 in decoding the PHY data units.

The client station 25-1 is configured to combine signals corresponding to the retransmission of the first MPDU with signals associated with the initial transmission of the first MPDU within the RX buffer, in various embodiments. In an embodiment, the client station 25-1 combines the signals for the first MPDU upon receipt of the second PHY data unit 316. In an embodiment, the client station 25-1 is configured to transmit an acknowledgment upon successfully decoding an MPDU. In the scenario illustrated in FIG. 3, the client station 25-1 successfully decodes the first MPDU based on the combined signals and in response, transmits an acknowledgment 318. In other scenarios, the client station 25-1 does not successfully decode the first MPDU and in response, the AP 14 transmits another PHY data unit, as described above with respect to the second PHY data unit 316. In an embodiment, the client station 25-1 is configured to discard or flush the first MPDU from the RX buffer after successfully decoding the first MPDU. In an embodiment, the AP 14 is configured to discard or flush the first MPDU from the TX buffer after receiving the acknowledgment 318.

In various embodiments and/or scenarios, the AP 14 is configured to send a plurality of MPDUs to the client station 25-1 during the HARQ session 300. In the scenario illustrated in FIG. 3, the AP 14 generates and transmits a third PHY data unit 320 with a second MPDU (MPDU 2) to the client station 25-1 during the TXOP 305. In this scenario, the client station 25-1 successfully decodes the second MPDU encapsulated within the second PHY data unit 320 and transmits an acknowledgment 322.

In some embodiments and/or scenarios, the AP 14 is configured to establish the HARQ session 300 for one-to-one transmissions. For example, in one scenario, the AP 14 transmits MPDUs only to one intended receiver (i.e., the client station 25-1). In an embodiment, the AP 14 indicates the intended receiver by setting the destination address of the request-to-send frame with the intended receiver's MAC address or other suitable identifier. In another embodiment, the AP 14 indicates the intended receiver with the HARQ control frame 304 (e.g., within a destination address field or other suitable field). In another embodiment, the intended receiver is indicated by the PHY signal field of PHY data units transmitted during the HARQ session 300. In yet another embodiment, the intended receiver is implicitly indicated by the packets within the MPDUs. In other embodiments and/or scenarios, the AP 14 is configured to establish the HARQ session 300 for one-to-many transmissions. In one such embodiment, the AP 14 is configured to indicate an intended receiver of each PHY data unit transmitted during the HARQ session 300 with the PHY signal field of the corresponding PHY data units (e.g., within a destination address field or other suitable field). In an embodiment, the AP 14 generates and transmits one or more PHY data units to the client station 25-2 during the TXOP 305, similarly to the PHY data units 314, 316, and 320 as described above.

Upon completion of the HARQ transmissions 312, the AP 14 and client station 25-1 perform a teardown 324 of the HARQ session 300, in various embodiments. In the embodiment shown in FIG. 3, the AP 14 initiates the teardown 324 by transmitting a HARQ control frame 326 and the client station 25-1 transmits an acknowledgment 328 to confirm the teardown 324. In other embodiments, the client station 25-1 initiates the teardown by sending the HARQ control frame 326. In an embodiment, the AP 14 and the client station 25-1 discard any MPDUs from the HARQ session 300 from the TX buffer and RX buffer, respectively.

Figure 4:
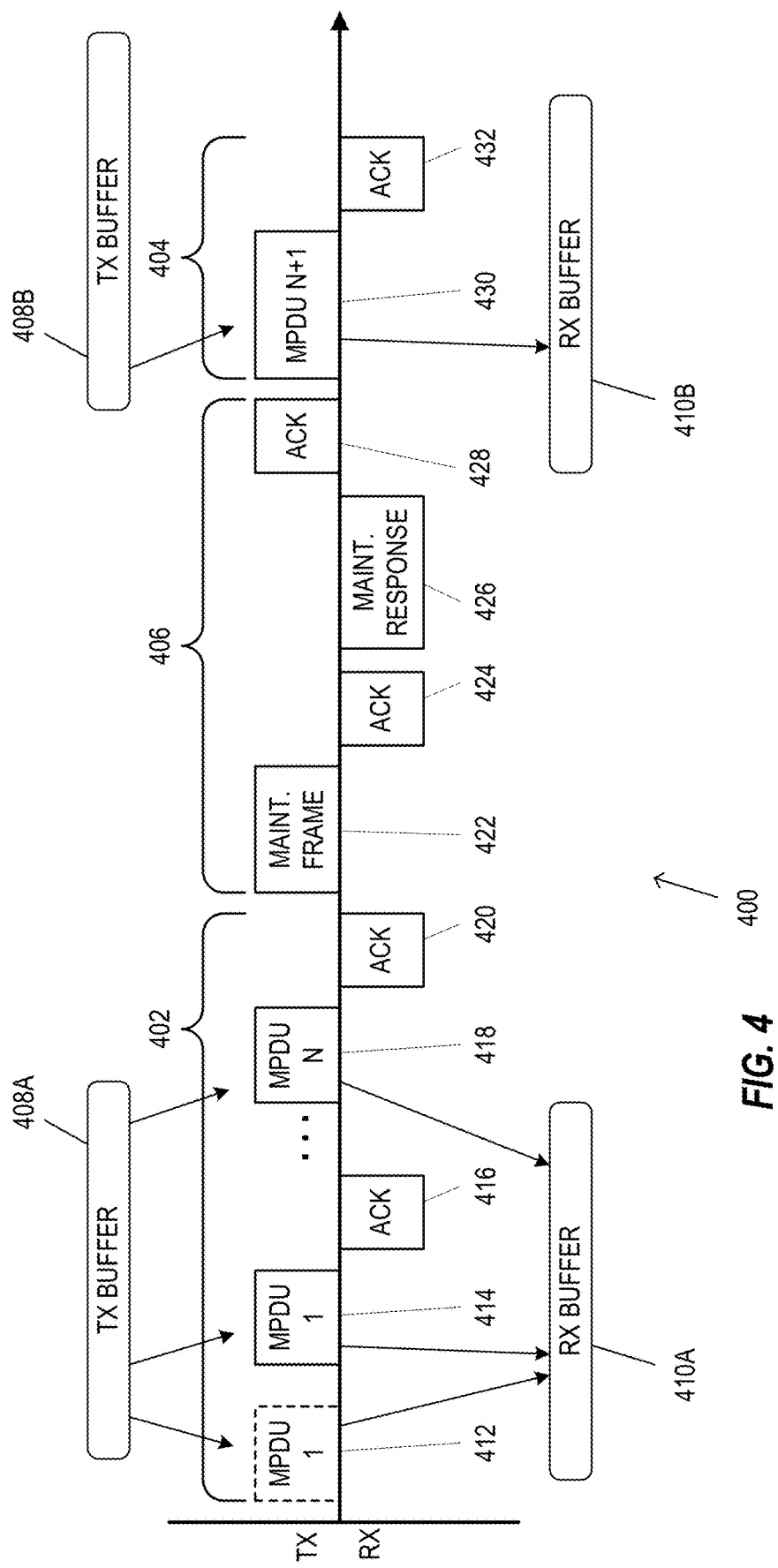
FIG. 4 is a message sequence diagram illustrating example messages for maintenance of a HARQ session, according to an embodiment.

FIG. 4 is a message sequence diagram illustrating example messages for maintenance of a HARQ session 400 between a first communication device and a second communication device, according to an embodiment. The HARQ session 400 includes HARQ transmissions 402, HARQ transmissions 404, and a maintenance period 406, in an embodiment. As described above with respect to FIG. 3, the first communication device is a transmitter, such as the AP 14, while the second communication device is a receiver, such as the client station 25-1. The AP 14 stores MPDUs in a TX buffer 408 (e.g., the transmit buffer 19) and the client station 25-1 stores MPDUs in an RX buffer 410 (e.g., the receive buffer 31), in an embodiment. In the scenario illustrated in FIG. 4, the AP 14 stores and transmits a number N MPDUs (e.g., MPDU 1, MPDU 2, . . . MPDU N) from the TX buffer 408A during the HARQ transmissions 402. In an embodiment, the AP 14 transmits at least N PHY data units, such as PHY data units 412, 414, and 418, for the N MPDUs. As illustrated in FIG. 4, the MPDU 1 of the PHY data unit 412 is not acknowledged by the client station 25-1 and the AP 14 performs a retransmission with PHY data unit 414. The client station 25-1 combines the MPDUs of the PHY data unit 412 and the PHY data unit 414 in RX buffer 410A, successfully decodes the MPDU 1, and transmits an acknowledgment 416, in the scenario of FIG. 4. The AP 14 and client station 25-1 continue to transmit additional MPDUs and acknowledgments, such as MPDU N in PHY data unit 418 with acknowledgment 420.

In various embodiments, the AP 14 and client station 25-1 enter the maintenance period 406. In an embodiment, the AP 14 and/or the client station 25-1 is configured to transmit one or more maintenance frames 422 to the client station 25-1. In an embodiment, the maintenance frame 422 includes one or more HARQ commands and/or requests. In various embodiments, the AP 14 or client station 25-1 transmits a maintenance frame to cause an MPDU to be discarded from the TX buffer 408 or RX buffer 410, to request or report a buffer status (e.g., a buffer status of the TX buffer 408 or RX buffer 410), to provide or request information about MPDUs currently stored in the TX buffer 408 or RX buffer 410, or other suitable commands and/or requests. In an embodiment, the client station 25-1 transmits an acknowledgment 424 of the maintenance frame 420. In some embodiments, the client station 25-1 transmits a maintenance response frame 426, in response to the maintenance frame 422, which includes one or more HARQ commands and/or requests, as described above. In an embodiment, the AP 14 transmits an acknowledgment 428 of the maintenance response frame 426 to signal and end of the maintenance period 406. In the scenario illustrated in FIG. 4, the AP 14 clears the TX buffer 408 and the client station 25-1 clears the RX buffer 410 during the maintenance period 406. During the HARQ transmissions 404, the AP 14 continues sending MPDUs from the end of the previous HARQ transmissions, in an embodiment. In the scenario illustrated in FIG. 4, the AP 14 transmits a PHY data unit 430 with the MPDU N+1 from the TX buffer 408B (e.g., after clearing the TX buffer 408), the client station 25-1 stores the MPDU N+1 in the RX buffer 410B (e.g., after clearing the RX buffer 410), and the client station 25-1 transmits an acknowledgment 432 to the AP 14.

Figure 5:
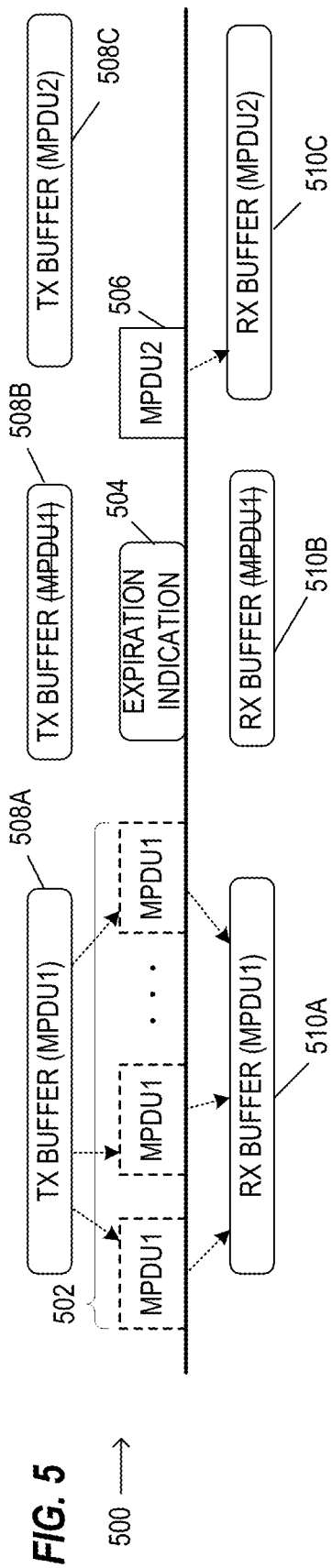
FIG. 5 is a message sequence diagram illustrating example messages for expiration of an MPDU during a HARQ session based on a transmission count, according to an embodiment.

FIG. 5 is a message sequence diagram illustrating example messages for expiration of an MPDU during a HARQ session 500 based on a transmission count, according to an embodiment. As described above with respect to FIG. 3, the first communication device is a transmitter, such as the AP 14, while the second communication device is a receiver, such as the client station 25-1. In an embodiment, the AP 14 and client station 25-1 are configured to discard MPDUs from the corresponding buffer after an expiration indication. In various embodiments, the expiration indication is a predetermined maximum number of retransmissions, a time to live, or other suitable expiration indicator. In some scenarios, the expiration indication causes MPDUs to be discarded to prevent a buffer overflow at the AP 14 and/or client station 25-1. In an embodiment, the expiration indication is negotiated between the AP 14 and client station 25-1 during initialization of the HARQ session 500.

In the scenario illustrated in FIG. 5, the AP 14 transmits a plurality of PHY data units 502, each including an MPDU 1, from TX buffer 508 (shown as 508A). The client station 25-1 stores each instance of the MPDU 1 in RX buffer 510 (shown as 510A) but fails to successfully decode the MPDU 1. After the expiration indication is met, the AP 14 discards the MPDU 1 from the TX buffer 508 (508B) and the client station 25-1 discards the MPDU 1 from the RX buffer 510 (510B). After discarding the MPDU 1, the AP 14 continues by transmitting a next MPDU 2 from the TX buffer 508 (508C) in PHY data unit 504. The client station 25-1 stores the MPDU 2 in the RX buffer 510 (510C).

Figure 6:
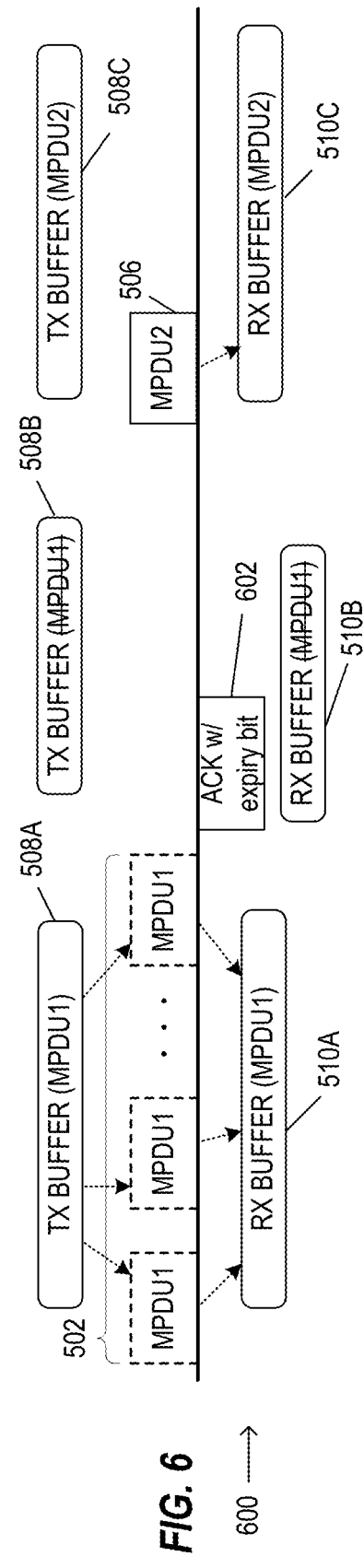
FIG. 6 is a message sequence diagram illustrating example messages for expiration of an MPDU during a HARQ session based on an acknowledgment message, according to another embodiment.

FIG. 6 is a message sequence diagram illustrating example messages for expiration of an MPDU during a HARQ session 600 based on an acknowledgment message, according to another embodiment. As described above with respect to FIG. 3, the first communication device is a transmitter, such as the AP 14, while the second communication device is a receiver, such as the client station 25-1. HARQ session 600 is similar to HARQ session 500, however, the expiration indication is an acknowledgment message 602 transmitted by the client station 25-1, in an embodiment. The acknowledgment message 602 includes an expiry bit or other suitable indication to the AP 14 to discard the MPDU 1 from the TX buffer 510, in an embodiment.

Figure 7:
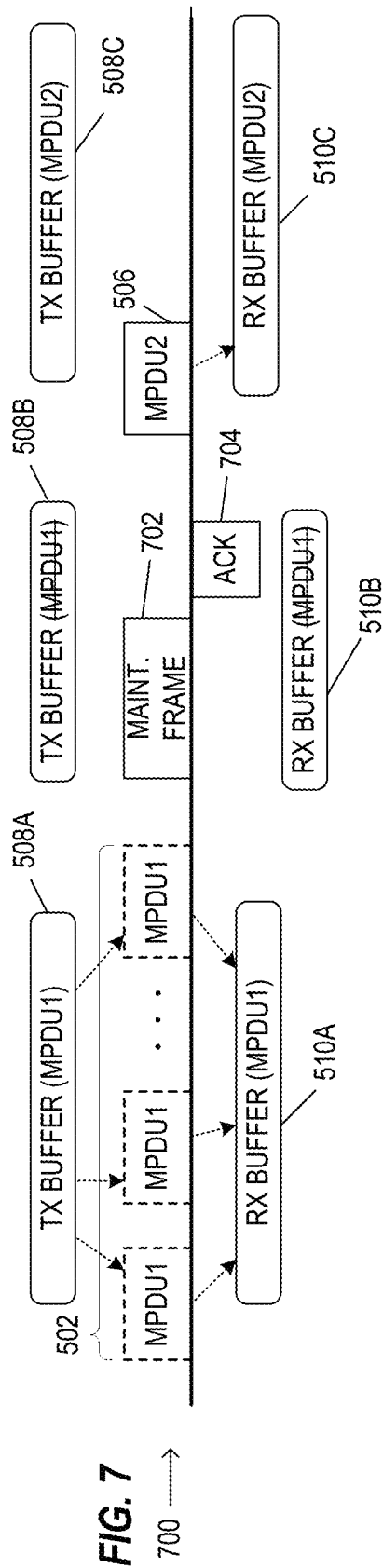
FIG. 7 is a message sequence diagram illustrating example messages for expiration of an MPDU during a HARQ session based on a maintenance message, according to yet another embodiment.

FIG. 7 is a message sequence diagram illustrating example messages for expiration of an MPDU during a HARQ session 700 based on a maintenance message, according to yet another embodiment. As described above with respect to FIG. 3, the first communication device is a transmitter, such as the AP 14, while the second communication device is a receiver, such as the client station 25-1. HARQ session 700 is similar to HARQ session 500, however, instead of the expiration indication, the AP 14 transmits a HARQ maintenance frame 702 to cause the client station 25-1 to discard the MPDU 1 from the RX buffer 510, in an embodiment. In response to the HARQ maintenance frame 702, the client station 25-1 discards the MPDU 1 from the RX buffer 510 and transmits an acknowledgment 704, in an embodiment. In another embodiment, the client station 25-1 transmits the HARQ maintenance frame 702 to cause the AP 14 to discard the MPDU 1 from the TX buffer 508.

Figure 8:
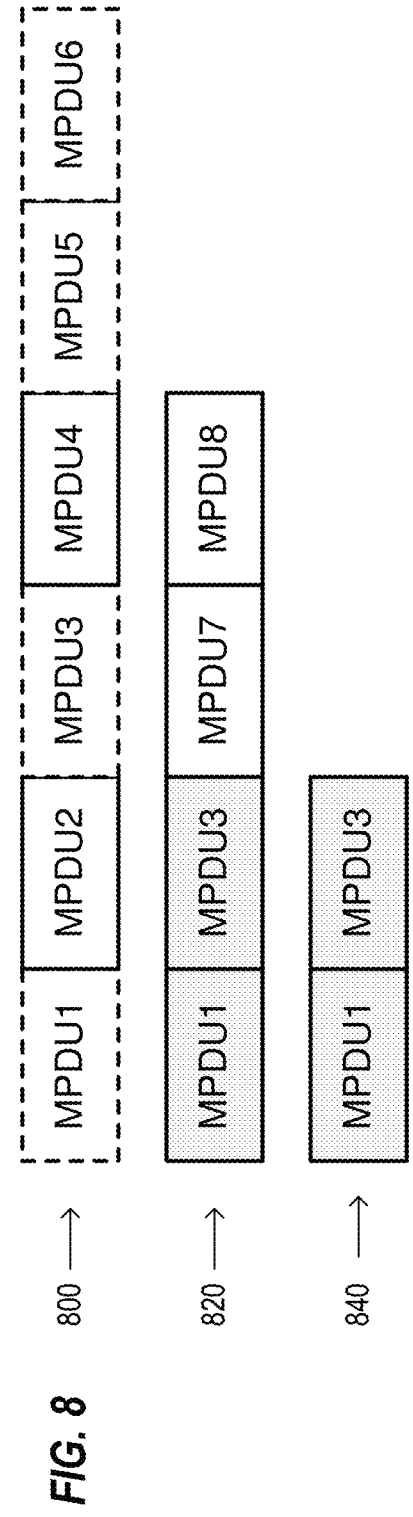
FIG. 8 is a diagram illustrating examples of a first aggregate MPDU (A-MPDU) for an initial transmission, a second A-MPDU for retransmission, and a third A-MPDU for retransmission, in an embodiment.

FIG. 8 is a diagram illustrating examples of a first aggregate MPDU (A-MPDU) 800 for an initial transmission, a second A-MPDU 820 for retransmission, and a third A-MPDU 840 for retransmission, in various embodiments. An A-MPDU allows aggregation of multiple MPDUs into one PSDU. In some embodiments, an A-MPDU includes a number of MPDU delimiters each followed by an MPDU. In some embodiments, the AP 14 appends one or more padding bits to the MPDU, for example, to provide each section of an A-MPDU with a multiple of 4 bytes in length.

Although the A-MPDU 800 is illustrated in FIG. 8 as having six MPDUs (MPDU1, MPDU2, MPDU3, MPDU4, MPDU5, MPDU6), the A-MPDU 800 can include different numbers (e.g., 1, 2, 3, 7, etc.) of MPDUs in other embodiments. In an embodiment, each MPDU of the A-MPDU 800 includes a frame delimiter, padding bits, and/or tail bits. In other embodiments, one or more of the frame delimiter, padding bits, and/or tail bits are omitted.

In the scenario illustrated in FIG. 8, the MPDU1, MPDU3, MPDU5, and MPDU6 (shown with dashed lines) are not successfully decoded by the client station 25-1, while the MPDU2 and MPDU 4 are successfully decoded during the initial transmission. In various embodiments, the client station 25-1 is configured to transmit a block acknowledgment to the AP 14 in response to the A-MPDU 800. In at least some embodiments, the block acknowledgment includes a plurality of acknowledgments that corresponds to the number of MPDUs of the A-MPDU 800 (i.e., one acknowledgment per MPDU). In some embodiments, a positive acknowledgment (e.g., for a successfully decoded MPDU) is indicated by a "1" while a negative acknowledgement (e.g., for an unsuccessfully decoded MPDU) is indicated by a "0" and thus the plurality of acknowledgments includes 6 bits. In other embodiments, other suitable indicators are used for positive and/or negative acknowledgments. In an embodiment, the block acknowledgment includes a negative acknowledgment for each MPDU that is not successfully decoded and a positive acknowledgment for each MPDU that is successfully decoded (i.e., "010100"). In at least some embodiments, the client station 25-1 is configured to determine a Boolean AND operation for each acknowledgment of the block acknowledgment. In the scenario illustrated in FIG. 8, the Boolean AND operation results in a block acknowledgment of "000000" because at least one MPDU was not successfully decoded. In another embodiment, the client station 25-1 is configured to provide a single acknowledgment for the A-MPDU 800 based on the Boolean AND operation (i.e., "0" instead of "000000"). In some embodiments, the client station 25-1 determines the Boolean AND operation to provide a simplified combination of signals upon receipt of a retransmission A-MPDU.

In at least some embodiments and/or scenarios, each MPDU within the A-MPDU 800 is retransmitted if at least one MPDU is not successfully decoded by the client station 25-1. In an embodiment, for example, the client station 25-1 requests a retransmission of the A-MPDU 800 in its entirety by performing the Boolean AND operation for the block acknowledgment. In an embodiment, the AP 14 generates and transmits a PHY data unit having a PHY signal field that includes a transmission version field set to indicate the retransmission of the first aggregate MPDU.

In some embodiments and/or scenarios, the AP 14 generates and transmits a partial A-MPDU, such as the A-MPDU 820 or A-MPDU 840, in response to the block acknowledgment. The AP 14 is configured to generate the A-MPDU 820 to include one or more MPDUs from the A-MPDU 800 which were not successfully decoded, along with one or more new MPDUs which were not previously transmitted (i.e., an initial transmission), in various embodiments. In an embodiment, the AP 14 is configured to generate the A-MPDU 820 to include up to a threshold number (e.g., 1, 2, 3, etc.) of MPDUs that correspond to negative acknowledgments. For example, in the scenario illustrated in FIG. 8, the threshold number is equal to 2 and thus the AP 14 generates the A-MPDU 820 to include the MPDU1 and MPDU3, omits the MPDU5 and MPDU6, and includes new MPDU7 and new MPDU8. In an embodiment, the A-MPDU 820 is configured to include the retransmitted MPDUS (MPDU1 and MPDU3) in a same relative ordering as in the A-MPDU 800. In an embodiment, the A-MPDU 820 is configured to include the retransmitted MPDUs in a beginning of the A-MPDU 820. In an embodiment, the AP 14 generates and transmits a PHY data unit for the A-MPDU 820 having a PHY signal field that includes a transmission version field set to indicate the retransmissions of the MPDU1 and MPDU3 and initial transmissions of the MPDU7 and MPDU8.

In another embodiment and/or scenario, the AP 14 is configured to generate the A-MPDU 840 to include only those MPDUs which were not successfully decoded from the initial transmission. In an embodiment, the AP 14 is configured to generate the A-MPDU 840 to include up to a threshold number of MPDUs that correspond to negative acknowledgments. For example, in the scenario illustrated in FIG. 8, the threshold number is equal to 2 and the AP 14 generates the A-MPDU 820 to include the MPDU1 and MPDU3 and omits the MPDU5 and MPDU6. In an embodiment, the A-MPDU 840 is configured to include the retransmitted MPDUS (MPDU1 and MPDU3) in a same relative ordering as in the A-MPDU 800. In an embodiment, the AP 14 generates and transmits a PHY data unit for the A-MPDU 840 having a PHY signal field that includes a transmission version field set to indicate the retransmissions of the MPDU1 and MPDU3.

In various embodiments and/or scenarios, the AP 14 is configured to process an A-MPDU as a single PSDU. In some embodiments, the AP 14 is configured to disable the PHY scrambler 204 for processing the A-MPDU as a single PSDU. In other embodiments and/or scenarios, the AP 14 is configured to transmit an A-MPDU as a plurality of PSDUs, for example, one PSDU for each MPDU within the A-MPDU. In some embodiments, the AP 14 is configured to, separately for each MPDU of an A-MPDU, encode a bit stream for the corresponding MPDU (or PSDU) into a coded bit stream (e.g., using FEC encoder 206) and to modulate and pack the coded bit stream into a group of orthogonal frequency division multiplexing (OFDM) symbols (e.g., using the constellation mapper 214). In an embodiment, the AP 14 concatenates the groups of OFDM symbols corresponding to each MPDU of the A-MPDU with each other, separated by a suitable delimiter that indicates MPDU boundaries.

FIG. 9 is a diagram illustrating an example coded bit stream 901 that includes one or more PHY service fields to indicate MPDU boundaries, in an embodiment. In the embodiment illustrated in FIG. 9, an A-MPDU 900 includes a first MPDU and a second MPDU (MPDU1, MPDU2) which are transmitted as a plurality of PSDUs 908 (PSDU1, PSDU2). In other embodiments, the A-MPDU 900 includes additional MPDUs and the plurality of PSDUs 908 includes additional PSDUs.

In an embodiment, the AP 14 generates the coded bit stream 901 that includes the plurality of PSDUs 908 and inserts one or more PHY service fields to indicate MPDU boundaries (i.e., PSDU boundaries). The PHY service field is configured to indicate a length of the coded PSDUs to indicate the MPDU boundaries. In various embodiments, for example, the length indicates a number of bits, a number of octets, or another suitable length indication. In an embodiment, the AP 14 is configured to separately encode each PSDU for a corresponding MPDU into a coded PSDU for the coded bit stream 901. For example, the AP 14 encodes the PSDU1 and the PSDU2 to obtain a coded PSDU1 912 and a coded PSDU2 916. In an embodiment, the AP 14 generates and encodes a PHY service field separately for each MPDU of the A-MPDU 900 (i.e., for each coded PSDU) for modulation and packing with the coded bit stream 901. In the embodiment illustrated in FIG. 9, the AP 14 generates and encodes a PHY service field 910 for the coded PSDU1 912 and a PHY service field 914 for the coded PSDU2 916 each of which are concatenated as illustrated in FIG. 9. In another embodiment, the AP 14 generates a single PHY service field for the coded bit stream 901. For example, in an embodiment, the AP 14 generates and encodes the PHY service field 910 to include the length indications for each coded PSDU of the coded bit stream 901 and omits the PHY service field 914.

In some embodiments, the AP 14 is configured to determine a number of OFDM symbols for a corresponding PHY data unit of the coded bit stream 901 based on the number of bits used by the PHY service fields 910 and 914 (i.e., "overhead" bits). In some embodiments, the AP 14 is configured to select one or more LDPC coding parameters, such as a number of LDPC codewords, a codeword size, a number of bits to be repeated, a number of bits to be punctured, or other suitable coding parameters based on the number of bits used by the PHY service fields 910 and 914. Where PHY service fields are used to indicate MPDU boundaries within the PHY data unit, the number of overhead bits $N_{overhead}$ is equal to a number of PSDUs within the PHY data unit multiplied by the length of PHY service field. In an embodiment, the FEC encoder 206 is a binary convolutional coder and the number of symbols $N_{sym}$ is equal to:

$$N_{sym} = \frac{\frac{8 \cdot length + 16 + 6 \cdot N_{ES}}{R} + N_{overhead}}{N_{CBPS}} \quad \text{Equ. 1}$$

where $N_{CBPS}$ is the number of coded bits per symbol, $N_{ES}$ is the number of encoders, R is the coding rate, and length is the length of the coded bit stream. In another embodiment, the FEC encoder 206 is an LDPC encoder, the number of symbols $N_{sym}$ is equal to $$N_{sym} = \frac{\frac{8 \cdot length + 16}{R} + N_{overhead}}{N_{CBPS}} \quad \text{Equ. 2}$$

and the total number of coded bits per frame $N_{TCB}$ is equal to $$N_{TCB} = N_{CBPS} \cdot N_{sym} - N_{overhead}. \quad \text{Equ. 3}$$

FIG. 10 is a diagram illustrating an example coded bit stream 1001 that includes cyclic sequences to indicate MPDU boundaries, in an embodiment. In the embodiment illustrated in FIG. 10, the AP 14 encodes the plurality of PSDUs 908 for the A-MPDU 900 to obtain the coded PSDUs 912 and 916, as described above with respect to FIG. 9. The AP 14 is configured to generate the coded bit stream 1001 by separately inserting, for each coded PSDU, a cyclic bit sequence that indicates the boundary of the corresponding coded PSDU, in an embodiment. In an embodiment, the AP 14 inserts a copy of the last M bits 1012 of the coded PSDU 912 as a cyclic bit sequence 1014 and inserts a copy of the last M bits 1018 of the coded PSDU 916 as a cyclic bit sequence 1020. In an embodiment, the number of M bits to be copied is a fixed number (e.g., 6 bits, 10 bits, etc.). In another embodiment, the number of M bits to be copied is a variable number, for example, based on a current modulation and coding scheme (MCS) for the corresponding PHY data unit. Although the cyclic sequences 1014 and 1020 are illustrated as prefixes in the embodiment illustrated in FIG. 10, in other embodiments a cyclic postfix is used based on a number of M bits copied from a beginning of the corresponding coded PSDU. In yet another embodiment, the AP 14 is configured to insert a cyclic sequence (e.g., prefix or postfix) as one or more OFDM symbols (i.e., a cyclic symbol sequence) after modulating and packing the coded PSDUs into OFDM symbols.

In some embodiments, the AP 14 is configured to determine a number of OFDM symbols for a corresponding PHY data unit of the coded bit stream 1001 based on the number of bits used by the cyclic sequences 1014 and 1020. In some embodiments, the AP 14 is configured to select one or more LDPC coding parameters, such as a number of LDPC codewords, a codeword size, a number of bits to be repeated, a number of bits to be punctured, or other suitable coding parameters based on the number of bits used by the cyclic sequences 1014 and 1020. In an embodiment, the number of overhead bits $N_{overhead}$ is equal to a number of PSDUs within the PHY data unit multiplied by the number of cyclic bits M, with the number of symbols $N_{sym}$ as described above with respect to FIG. 9. In another embodiment, the FEC encoder 206 is an LDPC encoder and the overhead bits $N_{overhead}$ is equal to a number of PSDUs within the PHY data unit multiplied by the number of cyclic symbols M and multiplied by the number of coded bits per subcarrier $N_{CBSCS}$, with the number of symbols $N_{sym}$ as described above with respect to FIG. 9.

Figure 11:
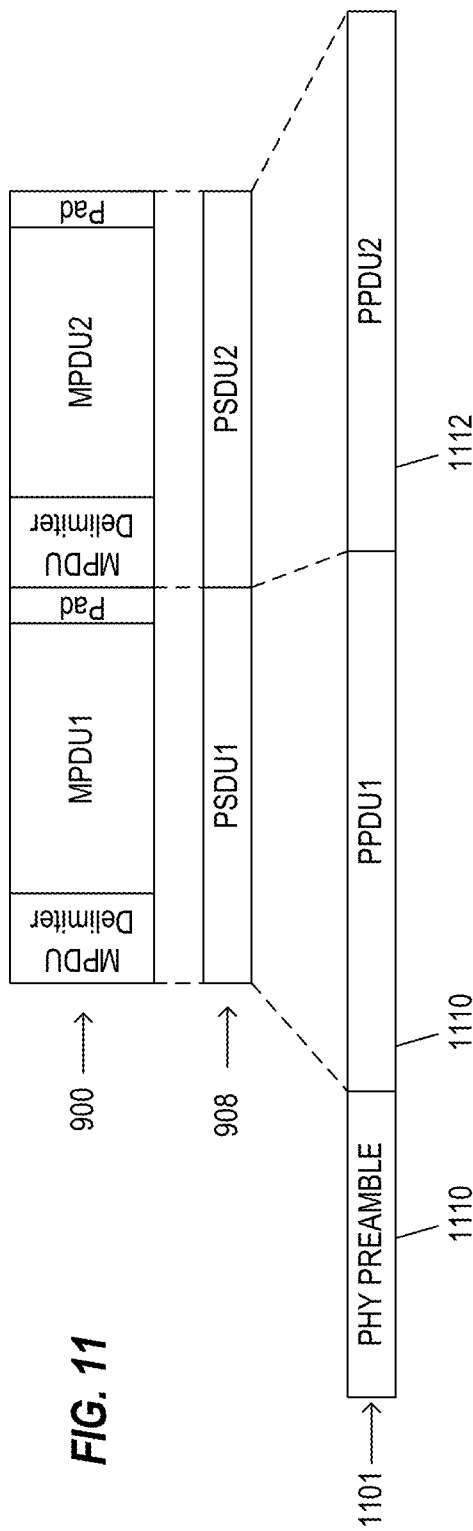
FIG. 11 is a diagram illustrating an example data field of a PHY protocol data unit (PPDU) that includes a PHY preamble to indicate MPDU boundaries, in an embodiment.

FIG. 11 is a diagram illustrating an example data field 1101 of a PHY data unit that includes a PHY preamble 1110 to indicate MPDU boundaries within the data field 1101, in an embodiment. The AP 14 is configured to encode, modulate, and pack a plurality of PSDUs to obtain a group of OFDM symbols corresponding to each PSDU for the data field 1101, in an embodiment. In the embodiment illustrated in FIG. 11, the AP 14 encodes, modulates, and packs the PSDU1 and PSDU2 for the A-MPDU 900 to obtain groups of OFDM symbols 1110 and 1112, respectively, for the data field 1101. The AP 14 is configured to generate the PHY preamble 1110 for the data field 1101 to indicate at least one HARQ parameter for each MPDU (or PSDU) within the PHY data unit. In various embodiments, the HARQ parameters indicate a length of the MPDUs (or PSDUs) within the data field 1101, such as a number of symbols of the groups of symbols 1110 and 1112. In an embodiment, the AP 14 is configured to encode, modulate, and pack the PHY preamble 1110 into OFDM symbols separately from the groups of OFDM symbols 1110 and 1112 and then concatenate the PHY preamble 1110 with the groups of OFDM symbols 1110 and 1112 to form the data field 1101.

FIG. 12 is a diagram illustrating an example PPDU 1200 that includes one or more signal fields to indicate MPDU (or PSDU) boundaries, in an embodiment. In the embodiment illustrated in FIG. 12, the AP 14 encodes, modulates, and packs the PSDU1 and PSDU2 for the A-MPDU 900 to obtain groups of OFDM symbols 1110 and 1112, respectively, for the PPDU 1200, as described above with respect to FIG. 11. In an embodiment, the AP 14 is configured to generate, separately for each PSDU, a PHY signal field that indicates at least one HARQ parameter for the corresponding MPDU. In the embodiment illustrated in FIG. 12, the AP 14 generates a first PHY signal field 1210 (SIG-1) for the group of OFDM symbols 1110 and a second PHY signal field 1214 (SIG-2) for the group of OFDM symbols 1112. In an embodiment, each of the PHY signal fields 1210 and 1214 includes HARQ parameters specific to the corresponding PSDU that follows (i.e., a length indicator). In another embodiment, the first PHY signal field 1210 includes general HARQ parameters for each PSDU within the PPDU 1200 in addition to the specific HARQ parameters for the first PSDU. In yet another embodiment, the AP 14 is configured to generate the first PHY signal field 1210 to indicate the general HARQ parameters and specific HARQ parameters for each PSDU within the PPDU 1200. In some embodiments, the AP 14 is configured to insert a gap between transmission of OFDM symbols for a PSDU (i.e., the group of OFDM symbols 1110) and a PHY signal field that follows the PSDU (i.e., the PHY signal field 1214).

FIG. 13 is a diagram illustrating an example PHY service data unit (PSDU) 1302 for a PHY data unit that includes groups of tail bits to indicate MPDU boundaries, in an embodiment. In various embodiments and/or scenarios, the AP 14 is configured to insert a number N tail bits into a bit stream for each MPDU of a PPDU. In an embodiment, the tail bits have a predetermined value, such as all zero bits, all 1 bits, or another suitable pattern. In an embodiment, the number N is a fixed number, such as 6, 10, etc. In another embodiment, the AP 14 selects the number N based on at least one of i) a number of encoders of the AP 14, ii) a frame length of the corresponding PHY data unit, or iii) a modulation and coding scheme for the corresponding PHY data unit. In an embodiment, for example, the number N of tail bits corresponds linearly with a number of encoders used for the PSDU 1302. In the embodiment illustrated in FIG. 13, the AP 14 is configured to process the A-MPDU 900 as a single PSDU using a disabled PHY scrambler 204. The AP 14 inserts tail bits 1306 after a PSDU portion 1304 corresponding to the first MPDU 904 and inserts tail bits 1310 after a PSDU portion 1308 corresponding to the second MPDU 906.

FIG. 14 is a diagram illustrating an example MPDU 1400 of an A-MPDU that includes groups of tail bits to indicate an MPDU boundary, in an embodiment. In the embodiment illustrated in FIG. 14, the AP 14 is configured to insert tail bits into the bit stream of each MPDU, as described above with respect to FIG. 13, but reduces the number N of tail bits to be inserted by a number of bits of MPDU padding 1402 which is already present within the MPDU 1400. In an embodiment, the AP 14 is configured to add one or more tail bits to meet a minimum number of bits for the MPDU padding 1402. In one scenario, the AP 14 does not add additional tail bits for an MPDU having 6 bits of MPDU padding 1402 when the minimum number of bits for the MPDU padding is 6 or less. In another scenario, the AP 14 adds 4 additional tail bits for an MPDU having 6 bits of MPDU padding 1402 when the minimum number of bits for the MPDU padding is 10. In an embodiment, the minimum number of padding bits is a fixed number, such as 6, 10, etc. In another embodiment, the AP 14 selects the minimum number based on at least one of i) a number of encoders of the AP 14, ii) a frame length of a corresponding PHY data unit, or iii) a modulation and coding scheme for the corresponding PHY data unit.

FIG. 15 is a diagram illustrating an example PHY signal field 1500 for PPDUs of a HARQ session, in an embodiment. The PHY signal field 1500 includes one or more HARQ fields 1502 and one or more non-HARQ fields 1504, in various embodiments. The non-HARQ fields 1504 include PHY signal fields as defined in IEEE 802.11ac or other suitable PHY protocols, such as a modulation and coding scheme (MCS) field, partial association identification (AID) field, group identification field, cyclic redundancy check (CRC) field, tail field, and/or other suitable fields. In at least some embodiments, the HARQ fields 1502 include a HARQ indication field, an address field, a transmission version field, and a length field. In other embodiments, the HARQ fields 1504 appear in a different order from the order illustrated in FIG. 15. In other embodiments, one or more HARQ fields are added or omitted from the PHY signal field 1500. The length field of the PHY signal field 1500 in an embodiment contains one or more sub-fields that indicate a length of a corresponding MPDU or PSDU within the PPDU.

The HARQ indication field of the PHY signal field 1500 indicates to a receiver whether the PHY signal field 1500 corresponds to a PPDU for a HARQ session (i.e., whether the PHY signal field 1500 is a HARQ signal field or non-HARQ signal field), in various embodiments. In at least some embodiment, the HARQ indication field indicates a number of MPDUs of an A-MPDU are included within the PPDU. In an embodiment, the HARQ indication field is a 1 bit flag, for example, having a value of "1" for a HARQ signal field or having a value of "0" for a non-HARQ signal field. In another embodiment, the HARQ indication field has a number N bits, where the bits indicate a number of HARQ MPDUs for a HARQ signal field and a value of all zeros indicates a non-HARQ signal field (e.g., as an implicit non-HARQ indicator). In yet another embodiment, the HARQ indication field includes N+1 bits, where a first bit is a one bit flag as described above and a second bit through the N+1 bits indicate a number of HARQ MPDUs.

In at least some embodiments, the address field of the PHY signal field 1500 indicates an address of a transmitter of the PPDU and an address of a receiver for the PPDU, for example, for an unprotected HARQ session. In an embodiment, the address of the transmitter and the address of the receiver are provided as separate sub-fields of the address field. In another embodiment, the address of the transmitter and the address of the receiver are combined into a single field. In an embodiment, an address for the transmitter and/or the receiver includes a partial AID field, for example, the last nine bits of a basic service set identification (BSSID) for transmissions to an access point or an identifier that combines an AID and the BSSID of its serving AP for transmissions to a client station. In another embodiment, the address for the transmitter and receiver are combined using the partial-AID field and one or more color bits.

In some embodiments, the address field of the PHY signal field 1500 is omitted. In an embodiment, the address field is omitted for one-to-one transmissions during a TXOP. In another embodiment, the address field is omitted for HARQ sessions initiated by a HARQ control frame. In other embodiments, the address field includes a receiver address but omits a transmitter address, for example, in a one-to-many HARQ session during a TXOP.

The transmission version field of the PHY signal field 1500 includes one or more sub-fields configured to indicate a HARQ transmission scheme for the PPDU, in various embodiments and/or scenarios. In an embodiment, the transmission version field includes one transmission version sub-field. In another embodiment, the transmission version field includes two transmission version sub-fields: a new transmission version sub-field and a retransmission version sub-field. In yet another embodiment, the transmission version field includes a number N retransmission sub-fields, for example, for a dedicated A-MPDU retransmission. In another embodiment, the transmission version field includes a number N+1 sub-fields, for example, a first new transmission version sub-field and a number N retransmission version sub-fields. In an embodiment, a transmission version sub-field contains a number K bits, for example, a first bit that indicates whether the corresponding MPDU is a new transmission or a retransmission and K−1 bits that indicate a retransmission version. In another embodiment, the transmission version sub-field contains a number K bits to indicate a transmission version with a reserved value of "0" to indicate a new transmission.

In various embodiments and/or scenarios, a PPDU includes a first instance of the PHY signal field 1500 as a primary PHY signal field and one or more second instances of the PHY signal field 1500 as secondary PHY signal fields. With reference to FIG. 12, in an embodiment, the primary PHY signal field corresponds to the first PHY signal field 1210 and the secondary PHY signal field corresponds to the second PHY signal field 1214. In at least some embodiments, the PPDU includes a primary PHY signal field that precedes a first PSDU and a respective secondary PHY signal field that precedes each additional PSDU. In an embodiment, the primary PHY signal field includes the general HARQ fields, a length sub-field for the first PSDU, and non-HARQ fields, while each secondary PHY signal field includes only a length sub-field for the corresponding PSDU (omitting the general HARQ fields and non-HARQ fields). In another embodiment, the primary PHY signal field includes the general HARQ fields, a length sub-field for the first PSDU, and non-HARQ fields while each secondary PHY signal field includes the general HARQ fields and a length sub-field for the corresponding PSDU (omitting the non-HARQ fields). In an embodiment, the primary PHY signal field includes the non-HARQ fields, the HARQ indication field, the address field, the transmission version sub-field for a first PSDU, and a length sub-field for a first PSDU, while the secondary PHY signal field includes a transmission version sub-field and a length sub-field for a corresponding PSDU (omitting the non-HARQ fields, the HARQ indication field, and the address field). In an embodiment, the secondary PHY signal fields include non-HARQ fields for a corresponding PSDU. In at least some embodiments, the secondary PHY signal fields omit at least some of the non-HARQ fields but keep the CRC field for improved reliability in decoding the secondary PHY signal field.

Figure 16:
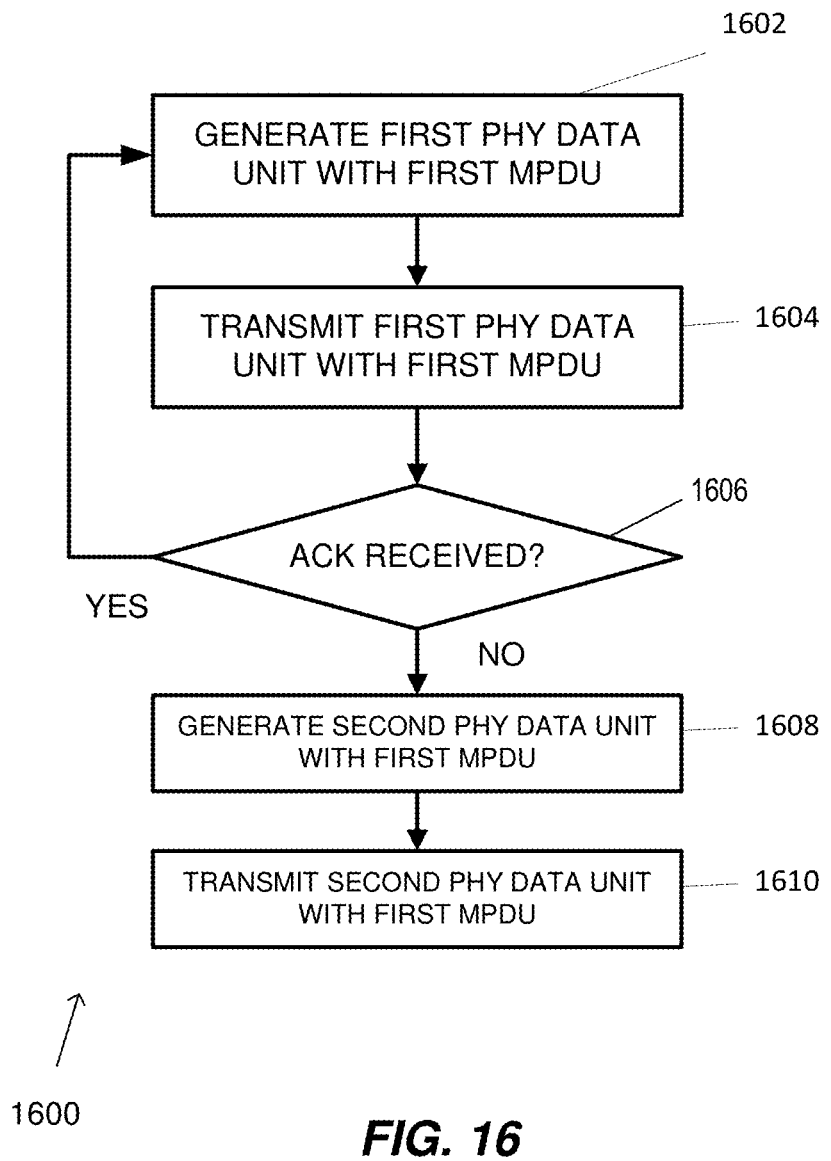
FIG. 16 is a flow diagram of an example method for transmission of MPDUs over a WLAN communication channel, in an embodiment.

FIG. 16 is a flow diagram of an example method 1600 for transmission of media access control (MAC) protocol data units (MPDUs) over a WLAN communication channel, in an embodiment. With reference to FIG. 1, the method 1600 is implemented by the network interface 16 of the AP 14, in an embodiment. For example, in one such embodiment, the PHY processing unit 20 is configured to implement the method 1600. According to another embodiment, the MAC processing 18 is also configured to implement at least a part of the method 1600. With continued reference to FIG. 1, in yet another embodiment, the method 1600 is implemented by the network interface 27 of the client station 25-1 (e.g., the PHY processing unit 29 and/or the MAC processing unit 28). In other embodiments, the method 1600 is implemented by other suitable network interfaces.

At block 1602, a first physical layer (PHY) data unit is generated, in an embodiment. The first PHY data unit has i) a data field that includes a first MPDU to be transmitted to a communication device, and ii) a PHY signal field that includes a transmission version field set to indicate an initial transmission of the first MPDU. In an embodiment, a first communication device, such as the AP 14, generates the first PHY data unit, for example, the PHY data unit 314 as described above with respect to FIG. 3. At block 1604, the first PHY data unit is transmitted over the WLAN communication channel to a second communication device, such as the client station 25-1, in an embodiment. In various embodiments and/or scenarios, the first PHY data unit is generated based on the coded bit stream 901 (FIG. 9), the coded bit stream 1001 (FIG. 10), the data field 1101 (FIG. 11), the PPDU 1200 (FIG. 12), the PSDU 1302 (FIG. 13), the MPDU 1400 (FIG. 14), and/or the PHY signal field 1500 (FIG. 15).

At block 1606, it is determined whether a first acknowledgment to the first MPDU has been received from the second communication device, in an embodiment. For example, in an embodiment, the AP 14 determines whether an acknowledgment has been after a PIFS time period and within a suitable second time period (e.g., an acknowledgment timeout period). In various embodiments and/or scenarios, the first MPDU is retransmitted or a second MPDU is transmitted based on the determination at block 1606. For example, in an embodiment, if it is determined at block 1606 that the acknowledgment has been received, then the flow proceeds to block 1602 for an initial transmission of a second MPDU.

On the other hand, if it is determined at block 1606 that the acknowledgment has not been received, then the flow proceeds to block 1608. At block 1608, in response to determining that the first acknowledgment has not been received, a second PHY data unit is generated having i) a data field that includes the first MPDU, and ii) a PHY signal field that includes a transmission version field set to indicate a retransmission of the first MPDU. For example, in an embodiment, the AP 14 generates the second PHY data unit 316, as described above with respect to FIG. 3. In various embodiments and/or scenarios, the second PHY data unit is generated based on the coded bit stream 901 (FIG. 9), the coded bit stream 1001 (FIG. 10), the data field 1101 (FIG. 11), the PPDU 1200 (FIG. 12), the PSDU 1302 (FIG. 13), the MPDU 1400 (FIG. 14), and/or the PHY signal field 1500 (FIG. 15).

At block 1610, the second PHY data unit is transmitted over the WLAN communication channel to the second communication device, in an embodiment. In some embodiments, block 1606 is repeated for determination of whether an acknowledgment to the second PHY data unit has been received. In an embodiment, additional PHY data units with the first MPDU are transmitted until an expiration indication occurs, such as the expiration indication 504 described above with respect to FIG. 5. In another embodiment, additional PHY data units with the first MPDU are transmitted until an expiration indication is received from the second communication device, such as the acknowledgment 602 described above with respect to FIG. 6. In an embodiment, additional PHY data units with the first MPDU are transmitted until a maintenance period 406, as described above with respect to FIG. 4.

Figure 17:
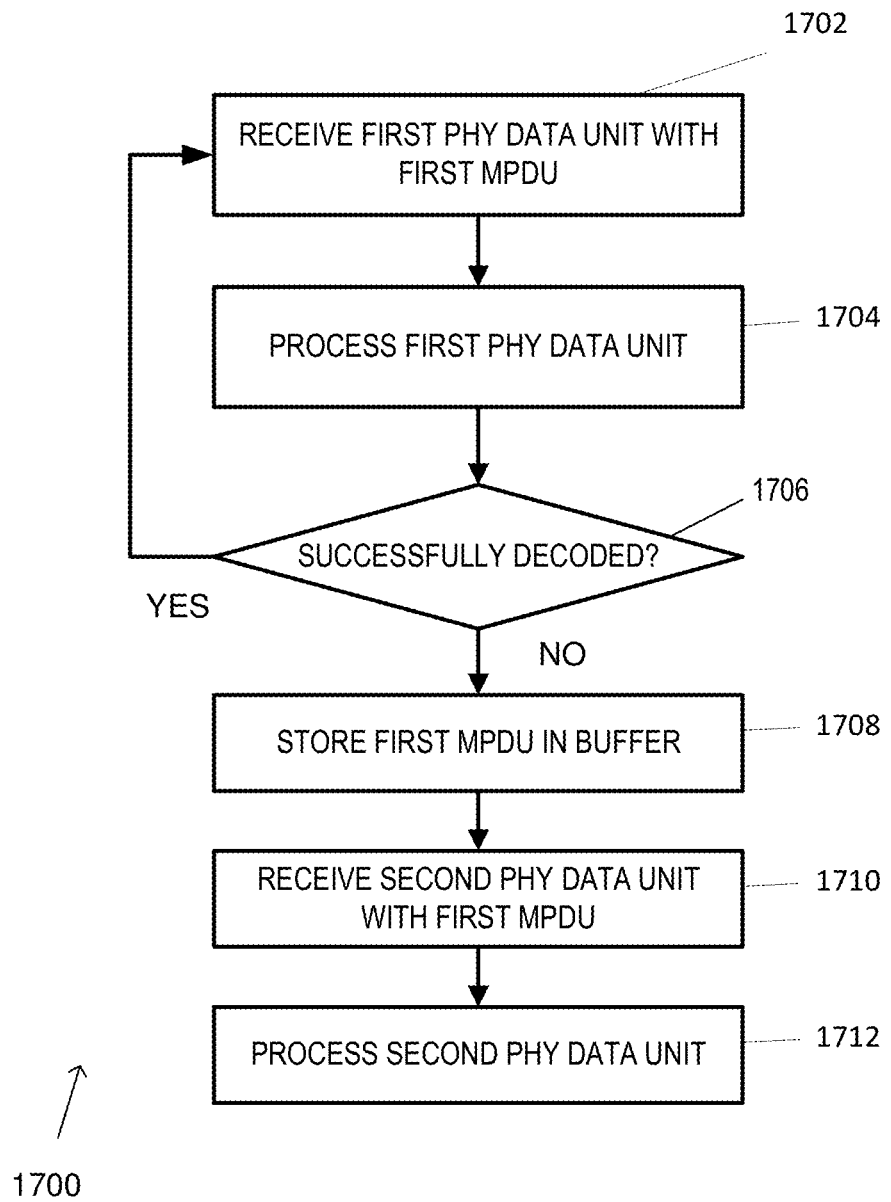
FIG. 17 is a flow diagram of an example method for reception of MPDUs over a WLAN communication channel, in an embodiment.

FIG. 17 is a flow diagram of an example method 1700 for reception MPDUs over a WLAN communication channel, in an embodiment. With reference to FIG. 1, the method 1700 is implemented by the network interface 16 of the AP 14, in an embodiment. For example, in one such embodiment, the PHY processing unit 20 is configured to implement the method 1700. According to another embodiment, the MAC processing 18 is also configured to implement at least a part of the method 1700. With continued reference to FIG. 1, in yet another embodiment, the method 1700 is implemented by the network interface 27 of the client station 25-1 (e.g., the PHY processing unit 29 and/or the MAC processing unit 28). In other embodiments, the method 1700 is implemented by other suitable network interfaces.

At block 1702, a first PHY data unit is received, in an embodiment. The first PHY data unit has i) a first MPDU, and ii) a PHY signal field that includes a transmission version field set to indicate an initial transmission of the first MPDU, in an embodiment. In an embodiment, the first PHY data unit corresponds to the PHY data unit 314 and is received by a receiver, such as the client station 25-1, as described above with respect to FIG. 3.

At block 1704, the first PHY data unit is processed to decode the first MPDU, in an embodiment. For example, in an embodiment, the client station 25-1 decodes the first PHY data unit using a PHY processing unit 200 based on a reverse process of the steps described above with respect to FIG. 2.

At block 1706, it is determined whether the first MPDU was successfully decoded, in an embodiment. For example, in an embodiment, it is determined whether a data field of the first MPDU corresponds to a frame check sequence of the first MPDU.

At block 1708, in response to determining that the first MPDU was not successfully decoded, the first MPDU is stored in a buffer, in an embodiment. For example, in an embodiment, the client station 25-1 stores the first MPDU in the receive buffer 31.

At block 1710, a second PHY data unit is received, in an embodiment. The second PHY data unit has i) the first MPDU, and ii) a PHY signal field that includes a transmission version field set to indicate a retransmission of the first MPDU, in an embodiment. For example, in an embodiment, the second PHY data unit corresponds to the PHY data unit 316, as described above with respect to FIG. 3.

At block 1712, a combination of the first MPDU of the second PHY data unit with the first MPDU stored in the receive buffer is processed to decode the first MPDU. For example, in an embodiment, the client station 25-1 combines signals corresponding to the retransmission of the first MPDU with signals associated with the initial transmission and decodes the first PHY data unit using the PHY processing unit 200, as described above with respect to FIG. 3.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any non-transitory computer readable medium or media such as a magnetic disk, an optical disk, a random access memory (RAM), a read only memory (ROM), a flash memory, a magnetic tape, etc. The software or firmware instructions may include machine readable instructions that, when executed by one or more processors, cause the processor to perform various acts.

When implemented in hardware, the hardware may comprise one or more of discrete components, an integrated circuit, an application-specific integrated circuit (ASIC), a programmable logic device, etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for communicating in a wireless local area network (WLAN) that includes a first communication device and a second communication device, the method comprising:

generating, at the first communication device, a first physical layer (PHY) data unit as part of a hybrid automatic repeat request (HARQ) session, the first PHY data unit having a first plurality of media access control (MAC) protocol data units (MPDUs) including a first MPDU, wherein generating the first PHY data unit includes: for each MPDU in the first plurality of MPDU, modulating and packing data of the MPDU into orthogonal frequency division multiplexing (OFDM) symbols such that each MPDU of the first plurality of MPDUs corresponds to a separate group of OFDM symbols in the first PHY data unit, each group of OFDM symbols in the first PHY data unit being formed with data from only a single respective MPDU of the first plurality of MPDUs wherein a constellation mapper is configured to map an interleaved sequence of bits in the single respective MPDU to constellation points corresponding to different subcarriers of an OFDM symbol;

transmitting, by the first communication device, the first PHY data unit;

determining, at the first communication device, that the second communication device did not acknowledge successfully receiving a set of one or more MPDUs among the first plurality of MPDUs, the set of one or more MPDUs including the first MPDU;

generating, at the first communication device, a second PHY data unit as part of the HARQ session, the second PHY data unit having a second plurality of MPDUs, including:

including at least the first MPDU in the second plurality of MPDUs in response to determining that the second communication device did not acknowledge successfully receiving the set of one or more MPDUs, and for each MPDU in the second plurality of MPDUs, modulating and packing data of the MPDU into OFDM symbols such that each MPDU of the second plurality of MPDUs corresponds to a separate group of OFDM symbols in the second PHY data unit, each group of OFDM symbols in the second PHY data unit being formed with data from only a single respective MPDU of the second plurality of MPDUs; and transmitting, by the first communication device, the second PHY data unit.

2. The method of claim 1, wherein: generating the second PHY data unit includes generating the second PHY data unit to include i) at least one MPDU, in the second plurality of MPDUs, that is an initial transmission in the HARQ session, and ii) a PHY signal field that includes a subfield set to indicate a number of MPDUs, among the second plurality of MPDUs, that correspond to HARQ retransmissions.

3. The method of claim 2, wherein: the first plurality of MPDUs includes a first MPDU and a second MPDU; the method further comprises
receiving from the second communication device a block acknowledgment to the first PHY data unit that includes
i) a negative acknowledgment for the first MPDU, and
ii) a positive acknowledgment for the second MPDU; and
determining that the second communication device did not acknowledge successfully receiving the set of one or more MPDUs among the first plurality of MPDUs includes
determining that the second communication device did not successfully receive the first MPDU based on the negative acknowledgment for the first MPDU.

4. The method of claim 1, wherein: the method further comprises
establishing, with the first communication device, a transmit opportunity (TXOP) period corresponding to the HARQ session;
transmitting the first PHY data unit comprises transmitting the first PHY data unit during the TXOP period; and
transmitting the second PHY data unit comprises transmitting the second PHY data unit during the TXOP period.

5. The method of claim 4, wherein establishing the TXOP period includes:
transmitting, by the first communication device, a request-to-send frame; and
receiving, at the first communication device, a clear-to-send frame in response to the request-to-send frame.

6. The method of claim 4, wherein establishing the TXOP period includes:
transmitting, by the first communication device, a HARQ control frame; and
receiving, at the first communication device, a response frame that acknowledges HARQ control frame.

7. The method of claim 1, wherein: generating the first PHY data unit includes
generating the first PHY data unit to include a first PHY signal field with a first subfield set to indicate that the first PHY data unit corresponds to the HARQ session; and
generating the second PHY data unit includes
generating the second PHY data unit to include a second PHY signal field with a second subfield set to indicate that the second PHY data unit corresponds to the HARQ session.

8. The method of claim 1, wherein: generating the first PHY data unit includes
disabling a scrambler of the first communication device while generating the first PHY data unit; and generating the second PHY data unit includes
disabling the scrambler while generating the second PHY data unit.

9. The method of claim 1, wherein: generating the first PHY data unit includes, separately for each MPDU of the first plurality of MPDUs:
encoding a bit stream for the MPDU into a coded bit stream, and
modulating and packing the coded bit stream for the MPDU into OFDM symbols such that each MPDU of the first plurality of MPDUs corresponds to a separate group of OFDM symbols in the first PHY data unit; and
generating the second PHY data unit includes, separately for each MPDU of the second plurality of MPDUs:
encoding a bit stream for the MPDU into a coded bit stream, and
modulating and packing the coded bit stream for the MPDU into OFDM symbols such that each MPDU of the second plurality of MPDUs corresponds to a separate group of OFDM symbols in the second PHY data unit.

10. The method of claim 9, wherein: generating the first PHY data unit includes, separately for each MPDU of the first plurality of MPDUs:
generating a service field for the MPDU, and
adding the service field to the coded bit stream for the MPDU; and generating the second PHY data unit includes, separately for each MPDU of the second plurality of MPDUs:
generating a service field for the MPDU, and
adding the service field to the coded bit stream for the MPDU.

11. An apparatus, comprising:
a wireless local area network (WLAN) interface device associated with a first communication device, the network interface device having one or more integrated circuits (ICs) configured to:
generate a first physical layer (PHY) data unit as part of a hybrid automatic repeat request (HARQ) session, the first PHY data unit having a first plurality of media access control (MAC) protocol data units (MPDUs) including a first MPDU, including: for each MPDU in the first plurality of MPDU,
modulate and pack data of the MPDU into orthogonal frequency division multiplexing (OFDM) symbols such that each MPDU of the first plurality of MPDUs corresponds to a separate group of OFDM symbols in the first PHY data unit, each group of OFDM symbols in the first PHY data unit being formed with data from only a single respective MPDU of the first plurality of MPDUs wherein a constellation mapper is configured to map an interleaved sequence of bits in the single respective MPDU to constellation points corresponding to different subcarriers of an OFDM symbol; and the one or more ICs are further configured to:
control the WLAN interface device to transmit the first PHY data unit,
determine that a second communication device did not acknowledge successfully receiving a set of one or more MPDUs among the first plurality of MPDUs, the set of one or more MPDUs including the first MPDU, and
generate a second PHY data unit as part of the HARQ session, the second PHY data unit having a second plurality of MPDUs, wherein generating the second PHY data unit comprises: including at least the first MPDU in the second plurality of MPDUs in response to determining that the second communication device did not acknowledge successfully receiving the set of one or more MPDUs, and for each MPDU in the second plurality of MPDUs,
modulate and pack data of the MPDU into OFDM symbols such that each MPDU of the second plurality of MPDUs corresponds to a separate group of OFDM symbols in the second PHY data unit, each group of OFDM symbols in the second PHY data unit being formed with data from only a single respective MPDU of the second plurality of MPDUs; and wherein the one or more ICs are further configured to control the WLAN interface device to transmit the second PHY data unit.

12. The apparatus of claim 11, wherein the one or more ICs are further configured to: generate the second PHY data unit to include
  i) at least one MPDU, in the second plurality of MPDUs, that is an initial transmission in the HARQ session, and
  ii) a PHY signal field that includes a subfield set to indicate a number of MPDUs, among the second plurality of MPDUs, that correspond to HARQ retransmissions.

13. The apparatus of claim 12, wherein: the first plurality of MPDUs includes a first MPDU and a second MPDU; and the one or more ICs are further configured to
  determine that the second communication device did not successfully receive the first MPDU based on a negative acknowledgment for the first MPDU in a block acknowledgment from the second communication device, the block acknowledgment corresponding to the first PHY data unit, wherein the block acknowledgment includes
  i) the negative acknowledgment for the first MPDU, and
  ii) a positive acknowledgment for the second MPDU.

14. The apparatus of claim 11, wherein the one or more ICs are further configured to:
  establish a transmit opportunity (TXOP) period corresponding to the HARQ session;
  control the WLAN interface device to transmit the first PHY data unit during the TXOP period; and
  control the WLAN interface device to transmit the second PHY data unit during the TXOP period.

15. The apparatus of claim 14, wherein the one or more ICs are further configured to:
  control the WLAN interface device to transmit a request-to-send frame for establishing the TXOP period; and
  receive a clear-to-send frame transmitted by the second communication device in response to the request-to-send frame, the clear-to-send frame for establishing the TXOP period.

16. The apparatus of claim 14, wherein the one or more ICs are further configured to:
  control the WLAN interface device to transmit a HARQ control frame for establishing the TXOP period; and
  receive a response frame transmitted by the second communication device that acknowledges HARQ control frame, the response frame for establishing the TXOP period.

17. The apparatus of claim 11, wherein the one or more ICs are further configured to:
  generate the first PHY data unit to include a first PHY signal field with a first subfield set to indicate that the first PHY data unit corresponds to the HARQ session; and
  generate the second PHY data unit to include a second PHY signal field with a second subfield set to indicate that the second PHY data unit corresponds to the HARQ session.

18. The apparatus of claim 11, wherein: the WLAN network interface device includes
  a scrambler implemented on the one or more ICs; and the one or more ICs are further configured to:
  disable the scrambler while generating the first PHY data unit, and
  disable the scrambler while generating the second PHY data unit.

19. The apparatus of claim 11, wherein: the WLAN network interface device includes
  a PHY processing unit implemented on the one or more ICs; the PHY processing unit is configured to
  generate the first PHY data unit and the second PHY data unit; the PHY processing unit is configured to, separately for each MPDU of the first plurality of MPDUs:
  encode a bit stream for the MPDU into a coded bit stream, and
  modulate and pack the coded bit stream for the MPDU into OFDM symbols such that each MPDU of the first plurality of MPDUs corresponds to a separate group of OFDM symbols in the first PHY data unit; and the PHY processing unit is further configured to, separately for each MPDU of the second plurality of MPDUs:
  encode a bit stream for the MPDU into a coded bit stream, and
  modulate and pack the coded bit stream for the MPDU into OFDM symbols such that each MPDU of the second plurality of MPDUs corresponds to a separate group of OFDM symbols in the second PHY data unit.

20. The apparatus of claim 19, wherein the one or more ICs are further configured to: separately for each MPDU of the first plurality of MPDUs:
  generate a service field for the MPDU, and
  add the service field to the coded bit stream for the MPDU; and separately for each MPDU of the second plurality of MPDUs:
  generate a service field for the MPDU, and
  add the service field to the coded bit stream for the MPDU.

21. The apparatus of claim 11, wherein the WLAN network interface device comprises:
  a plurality of transceivers implemented using the one or more ICs.

22. The apparatus of claim 21, further comprising:
  a plurality of antennas coupled to the plurality of transceivers.

* * * * *